(«12») United States Patent
Wang et al.

(10) Patent No.: US 10,955,540 B2
(45) Date of Patent: Mar. 23, 2021

(54) DETECTION SYSTEM

(71) Applicant: Aptiv Technologies Limited, St. Michael (BB)

(72) Inventors: Yu Wang, Troy, MI (US); Liang Ma, Rochester Hills, MI (US); Robert J. Cashler, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 372 days.

(21) Appl. No.: 15/840,321

(22) Filed: Dec. 13, 2017

(65) Prior Publication Data

US 2019/0170867 A1    Jun. 6, 2019

Related U.S. Application Data

(60) Provisional application No. 62/593,418, filed on Dec. 1, 2017.

(51) Int. Cl.
*G01S 13/08* (2006.01)
*G01S 17/08* (2006.01)
(Continued)

(52) U.S. Cl.
CPC .............. *G01S 13/08* (2013.01); *B60D 1/245* (2013.01); *G01S 7/2927* (2013.01); *G01S 7/411* (2013.01);
(Continued)

(58) Field of Classification Search
None
See application file for complete search history.

(56) References Cited

U.S. PATENT DOCUMENTS 5,361,072 A    11/1994  Barrick et al.
5,517,196 A     5/1996  Pakett et al.
(Continued)

FOREIGN PATENT DOCUMENTS

CN       1559842      1/2005
CN     101268383      9/2008
(Continued)

OTHER PUBLICATIONS

DE102009007990 machine translation (Year: 2009).*
(Continued)

*Primary Examiner* — Whitney Moore
(74) *Attorney, Agent, or Firm* — Colby Nipper PLLC

(57) ABSTRACT

A detection system includes a ranging-sensor and a controller-circuit. The ranging-sensor is configured to detect objects proximate to a host-vehicle. The controller-circuit is in communication with the ranging-sensor. The controller-circuit is configured to determine that a trailer is being towed by the host-vehicle and determine a trailer-distance between the host-vehicle and a front of the trailer based on a distance to a first-group of objects detected by the ranging-sensor. The first-group is characterized by a first-distance indicated by the ranging-sensor. The controller-circuit determines an axle-distance between the front of the trailer and a trailer-axle based on a second-group of objects. The second-group is characterized by a second-distance indicated by the ranging-sensor. The controller-circuit determines a trailer-length based on the trailer-distance and the axle-distance.

44 Claims, 15 Drawing Sheets

(51) Int. Cl.
  *G01S 7/48* (2006.01)
  *G01S 7/41* (2006.01)
  *G01S 13/88* (2006.01)
  *G01S 7/292* (2006.01)
  *G01S 13/87* (2006.01)
  *B60D 1/24* (2006.01)
  *G01S 17/87* (2020.01)
  *G01S 17/88* (2006.01)
  *G01S 13/931* (2020.01)

(52) U.S. Cl.
  CPC ............ *G01S 7/412* (2013.01); *G01S 7/4802* (2013.01); *G01S 13/878* (2013.01); *G01S 13/88* (2013.01); *G01S 17/08* (2013.01); *G01S 17/87* (2013.01); *G01S 17/88* (2013.01); *G01S 2013/9323* (2020.01); *G01S 2013/93272* (2020.01)

(56) References Cited

U.S. PATENT DOCUMENTS

| | | |
|---|---|---|
| 6,933,837 B2 | 8/2005 | Gunderson et al. |
| 7,786,849 B2 | 8/2010 | Buckley |
| 7,904,222 B2 | 3/2011 | Lee et al. |
| 8,665,078 B2 | 3/2014 | Van Wiemeersch et al. |
| 9,211,889 B1 | 12/2015 | Hoetzer et al. |
| 9,296,423 B2 | 3/2016 | Rupp et al. |
| 9,373,044 B2 | 6/2016 | Wallat et al. |
| 9,477,894 B1 | 10/2016 | Reed et al. |
| 9,566,911 B2 | 2/2017 | Greenwood et al. |
| 9,594,155 B2 | 3/2017 | Cashler et al. |
| 9,796,228 B2 | 10/2017 | Hu et al. |
| 9,804,022 B2 | 10/2017 | Kyrtsos et al. |
| 9,910,151 B2 | 3/2018 | Cashler |
| 9,937,953 B2 | 4/2018 | Lavoie et al. |
| 9,975,480 B2 | 5/2018 | Lai et al. |
| 10,207,643 B2 | 2/2019 | Prasad et al. |
| 10,276,049 B2 | 4/2019 | Prasad et al. |
| 10,286,916 B2 | 5/2019 | Prasad et al. |
| 10,351,146 B2 | 7/2019 | Prasad et al. |
| 10,393,862 B2 | 8/2019 | Cashler et al. |
| 10,481,255 B2 | 11/2019 | Prasad et al. |
| 10,838,054 B2 | 11/2020 | Wang et al. |
| 2008/0169938 A1 | 7/2008 | Madau |
| 2008/0186204 A1 | 8/2008 | Buckley |
| 2009/0005932 A1 | 1/2009 | Lee et al. |
| 2010/0109938 A1 | 5/2010 | Oswald et al. |
| 2011/0140872 A1 | 6/2011 | McClure |
| 2011/0257860 A1 | 10/2011 | Getman et al. |
| 2012/0041659 A1 | 2/2012 | Greene |
| 2012/0169523 A1 | 7/2012 | Lee et al. |
| 2013/0027195 A1 | 1/2013 | Van Wiemeersch et al. |
| 2013/0169425 A1 | 7/2013 | Victor et al. |
| 2013/0176161 A1 | 7/2013 | Derham et al. |
| 2013/0222592 A1 | 8/2013 | Gieseke |
| 2013/0226390 A1 | 8/2013 | Luo et al. |
| 2014/0085472 A1 | 3/2014 | Lu et al. |
| 2014/0160276 A1 | 6/2014 | Pliefke et al. |
| 2014/0160279 A1 | 6/2014 | Pliefke et al. |
| 2014/0176716 A1 | 6/2014 | Wallat et al. |
| 2014/0218522 A1 | 8/2014 | Lavoie et al. |
| 2014/0222288 A1 | 8/2014 | Lavoie et al. |
| 2014/0267688 A1 | 9/2014 | Aich et al. |
| 2014/0267689 A1 | 9/2014 | Lavoie |
| 2014/0277942 A1 | 9/2014 | Kyrtsos et al. |
| 2014/0303849 A1 | 10/2014 | Hafner et al. |
| 2015/0120141 A1 | 4/2015 | Lavoie et al. |
| 2016/0041258 A1* | 2/2016 | Cashler ............... G01S 7/521 342/70 |
| 2016/0084943 A1 | 3/2016 | Arage |
| 2016/0098604 A1 | 4/2016 | Min |
| 2016/0101811 A1 | 4/2016 | Kyrtsos et al. |
| 2016/0153778 A1 | 6/2016 | Singh et al. |
| 2016/0167651 A1 | 6/2016 | Schwindt et al. |
| 2016/0209211 A1 | 7/2016 | Song et al. |
| 2016/0252610 A1 | 9/2016 | Smith et al. |
| 2016/0297361 A1 | 10/2016 | Drazan et al. |
| 2017/0080928 A1 | 3/2017 | Wasiek et al. |
| 2017/0217368 A1 | 8/2017 | Lewis et al. |
| 2017/0242443 A1 | 8/2017 | Schuh et al. |
| 2017/0305436 A1 | 10/2017 | Maskell et al. |
| 2017/0363727 A1 | 12/2017 | Prasad et al. |
| 2017/0363728 A1 | 12/2017 | Prasad et al. |
| 2018/0011172 A1 | 1/2018 | Cashler et al. |
| 2018/0025499 A1 | 1/2018 | Strano et al. |
| 2018/0045823 A1 | 2/2018 | Prasad et al. |
| 2018/0061239 A1 | 3/2018 | Prasad et al. |
| 2018/0068447 A1 | 3/2018 | Prasad et al. |
| 2018/0068566 A1 | 3/2018 | Prasad et al. |
| 2018/0203106 A1 | 7/2018 | Di et al. |
| 2019/0086204 A1 | 3/2019 | Critchley et al. |
| 2019/0232964 A1 | 8/2019 | Lindholm |
| 2019/0308473 A1 | 10/2019 | Yu et al. |
| 2019/0335100 A1 | 10/2019 | Chen et al. |
| 2019/0347498 A1 | 11/2019 | Herman et al. |
| 2020/0079165 A1 | 3/2020 | Niewiadomski et al. |
| 2020/0081117 A1 | 3/2020 | Flores Tapia et al. |
| 2020/0110163 A1 | 4/2020 | Wang et al. |
| 2020/0256953 A1 | 8/2020 | Wang et al. |
| 2021/0011145 A1 | 1/2021 | Wang et al. |

FOREIGN PATENT DOCUMENTS

| | | |
|---|---|---|
| CN | 102609953 | 7/2012 |
| CN | 203047062 | 7/2013 |
| CN | 104890671 | 9/2015 |
| CN | 205044655 | 2/2016 |
| CN | 105501114 | 4/2016 |
| DE | 10312548 | 5/2004 |
| DE | 10325192 | 1/2005 |
| DE | 10 2004 059596 A1 | 6/2006 |
| DE | 102005019550 | 11/2006 |
| DE | 102005042729 | 3/2007 |
| DE | 102006028625 | 10/2007 |
| DE | 10 2009 007990 A1 | 8/2010 |
| DE | 102014107917 | 9/2015 |
| EP | 2045155 | 4/2009 |
| EP | 2 551 132 A1 | 1/2013 |
| EP | 2942766 | 11/2015 |
| EP | 2 983 006 A1 | 2/2016 |
| EP | 3021140 | 5/2016 |
| EP | 3031687 | 6/2016 |
| EP | 3267222 | 1/2018 |
| EP | 3291205 | 3/2018 |
| GB | 2447672 | 9/2008 |
| GB | 2505666 | 3/2014 |
| GB | 2518857 | 4/2015 |
| JP | H09267762 | 10/1997 |
| JP | 2002068032 | 3/2002 |
| WO | 2006114206 | 11/2006 |
| WO | 2007028433 | 3/2007 |
| WO | 2016015938 | 2/2016 |

OTHER PUBLICATIONS

U.S. Appl. No. 15/186,601, entitled "Trailer Estimation and Blind Spot Information system Performance Improvement", filed Jun. 20, 2016, Prasad, et al.

U.S. Appl. No. 15/204,071, entitled "Trailer Estimation With Elevation Enhanced Sensing", filed Jul. 7, 2016, Cashler, et al.

U.S. Appl. No. 15/232,577, entitled "Trailer Dimension Estimation With Two Dimensional Radar and Camera", filed Aug. 9, 2016, Prasad, et al.

U.S. Appl. No. 15/186,602, entitled "Trailer Estimation Improvement", filed Jun. 20, 2016, Prasad, et al.

U.S. Appl. No. 15/259,126, entitled "Trailer Lane Departure Warning and Sway Alert", filed Sep. 8, 2016, Prasad, et al.

U.S. Appl. No. 15/257,062, entitled Camera Based Trailer Detection and Tracking, filed Sep. 6, 2017, Prasad, et al.

(56) References Cited

OTHER PUBLICATIONS

U.S. Appl. No. 15/250,072, entitled "Camera Based Trailer Identification and Blind Zone Adjustment", filed Aug. 29, 2016, Prasad, et al.
European Search Report for Application No. 18208733, European Patent Office, dated Apr. 22, 2019.
European Search Report for Application No. 18208733, European Patent Office, dated Sep. 6, 2019.
"Advisory Action", U.S. Appl. No. 15/232,577, dated Feb. 6, 2019, 3 pages.
"Advisory Action", U.S. Appl. No. 15/204,071, dated Apr. 10, 2019, 3 pages.
"Advisory Action", U.S. Appl. No. 15/250,072, dated Sep. 11, 2018, 3 pages.
"Advisory Action", U.S. Appl. No. 15/257,062, dated Sep. 18, 2018, 3 pages.
"Corrected Notice of Allowability", U.S. Appl. No. 15/186,602, dated May 3, 2019, 4 pages.
"Extended European Search Report", EP Application No. 17184001.0, dated Jan. 12, 2018, 8 pages.
"Extended European Search Report", EP Application No. 17186999.3, dated Jan. 17, 2018, 7 pages.
"Extended European Search Report", EP Application No. 17187300.3, dated Jan. 17, 2018, 7 pages.
"Extended European Search Report", EP Application No. 17188610.4, dated Feb. 13, 2018, 8 pages.
"Extended European Search Report", EP Application No. 17174836.1, dated Nov. 22, 2017, 10 pages.
"Extended European Search Report", EP Application No. 17174842.9, dated Nov. 23, 2017, 10 pages.
"Extended European Search Report", EP Application No. 17176204.0, dated Dec. 8, 2017, 7 pages.
"Final Office Action", U.S. Appl. No. 15/186,602, dated Jan. 14, 2019, 10 pages.
"Final Office Action", U.S. Appl. No. 15/259,126, dated Jun. 1, 2018, 14 pages.
"Final Office Action", U.S. Appl. No. 15/257,062, dated Jul. 13, 2018, 7 pages.
"Final Office Action", U.S. Appl. No. 15/250,072, dated Jul. 16, 2018, 9 pages.
"Final Office Action", U.S. Appl. No. 15/232,577, dated Nov. 26, 2018, 8 pages.
"Final Office Action", U.S. Appl. No. 15/204,071, dated Dec. 17, 2018, 7 pages.
"Foreign Office Action", CN Application No. 201710542068.6, dated Mar. 9, 2020, 12 pages.
"Foreign Office Action", CN Application No. 201710464962.6, dated Mar. 10, 2020, 18 pages.
"Foreign Office Action", EP Application No. 17187300.3, dated May 14, 2020, 4 pages.
"Foreign Office Action", CN Application No. 201710806769.6, dated Jun. 9, 2020, 17 pages.
"Foreign Office Action", CN Application No. 201710464625.7, dated Jun. 17, 2020, 9 pages.
"Foreign Office Action", CN Application No. 201710464625.7, dated Jul. 11, 2019, 12 pages.
"Foreign Office Action", CN Application No. 201710806769.6, dated Dec. 4, 2019, 20 pages.
"Non-Final Office Action", U.S. Appl. No. 15/259,126, dated Jan. 18, 2018, 12 pages.
"Non-Final Office Action", U.S. Appl. No. 15/257,062, dated Feb. 7, 2018, 7 pages.
"Non-Final Office Action", U.S. Appl. No. 15/250,072, dated Mar. 27, 2018, 10 pages.
"Non-Final Office Action", U.S. Appl. No. 15/232,577, dated Mar. 28, 2019, 10 pages.
"Non-Final Office Action", U.S. Appl. No. 15/186,601, dated May 29, 2018, 7 pages.
"Non-Final Office Action", U.S. Appl. No. 15/232,577, dated Jun. 8, 2018, 7 pages.
"Non-Final Office Action", U.S. Appl. No. 15/186,602, dated Jul. 19, 2018, 10 pages.
"Non-Final Office Action", U.S. Appl. No. 15/204,071, dated Jul. 19, 2018, 6 pages.
"Notice of Allowance", U.S. Appl. No. 15/250,072, dated Jan. 2, 2019, 5 pages.
"Notice of Allowance", U.S. Appl. No. 15/186,601, dated Jan. 18, 2019, 7 pages.
"Notice of Allowance", U.S. Appl. No. 15/186,602, dated Mar. 20, 2019, 7 pages.
"Notice of Allowance", U.S. Appl. No. 15/204,071, dated May 21, 2019, 8 pages.
"Corrected Notice of Allowance", U.S. Appl. No. 16/154,848, dated Oct. 19, 2020, 2 pages.
"Detection System", U.S. Appl. No. 62/593,418, filed Dec. 1, 2017, 56 pages.
"European Search Report", EP Application No. 19199564, dated Feb. 20, 2020, 2 pages.
"European Search Report", EP Application No. 20152210, dated Mar. 23, 2020, 2 pages.
"Non-Final Office Action", U.S. Appl. No. 17/037,307, dated Oct. 23, 2020, 7 pages.
"Notice of Allowance", U.S. Appl. No. 16/154,848, dated Jul. 1, 2020, 9 pages.
"Trailer Detection System and Method", U.S. Appl. No. 16/270,199, filed Feb. 7, 2019, 24 pages.

\* cited by examiner

DETECTION SYSTEM

TECHNICAL FIELD OF INVENTION

This disclosure generally relates to a detection system, and more particularly relates to a trailer detection system.

BRIEF DESCRIPTION OF DRAWINGS

The present invention will now be described, by way of example with reference to the accompanying drawings, in which.

The reference numbers of similar elements in the embodiments shown in the various figures share the last two digits.

DETAILED DESCRIPTION

Figure 1:
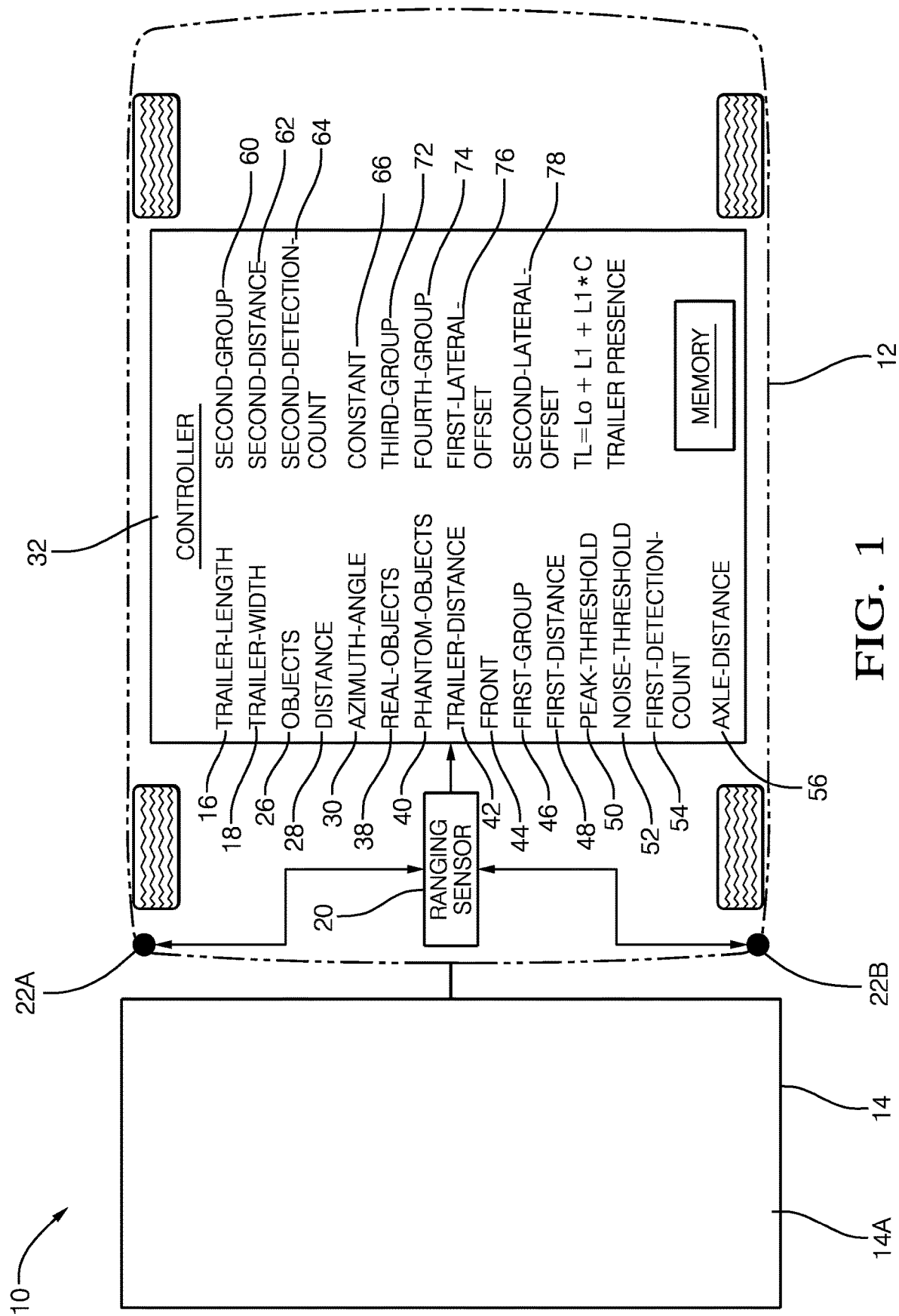
FIG. 1 is an illustration of a detection system in accordance with one embodiment.

FIG. 1 illustrates a non-limiting example of a detection system 10, hereafter referred to as the system 10, installed on a host-vehicle 12 towing a trailer 14. As will be described in more detail below, the system 10 in an improvement over other detection systems because the system 10 estimates a trailer-length 16 and trailer-width 18 based on detected targets by filtering out erroneous detections. The system 10 provides the technical benefit of enabling an adjustment of a blind zone of the host-vehicle 12 based on the size of the trailer 14, improving safety for the driver and other vehicles. In some embodiments, the trailer 14 may be a cargo-trailer 14A that may be an enclosed-type with solid panels, while in other embodiments of the cargo-trailer 14A may be an open-type with an exposed frame. In the examples illustrated in FIGS. 1-5B the trailer 14 is a cargo-trailer 14A.

The system 10 includes a ranging-sensor 20. The ranging-sensor 20 may be a radar-sensor or a lidar-sensor as will be understood by those in the art. The ranging-sensor 20 is configured to detect objects 26 proximate to the host-vehicle 12. In the example illustrated in FIG. 1, the ranging-sensor 20 is a radar-sensor. The radar-sensor detects the radar-signal that is reflected by the features of the cargo-trailer 14A towed by the host-vehicle 12. Typical radar-systems on vehicles are capable of only determining a distance 28 (i.e. range) and azimuth-angle 30 to the target so may be referred to as a two-dimensional (2D) radar-system. Other radar-systems are capable of determining an elevation-angle to the target so may be referred to as a three-dimensional (3D) radar-system. In the non-limiting example illustrated in FIG. 1, the 2D radar-sensor includes a left-sensor 22A and a right-sensor 22B. It is contemplated that the teachings presented herein are applicable to both 2D radar-systems and 3-D radar-systems with one or more sensor devices, i.e. multiple instances of the radar-sensor. The radar-sensor is generally configured to detect the radar-signal that may include data indicative of the detected-target present on the cargo-trailer 14A. As used herein, the detected-target present on the cargo-trailer 14A may be a feature of the cargo-trailer 14A that is detected by the radar-sensor and tracked by a controller-circuit 32, as will be described below.

Figure 2:
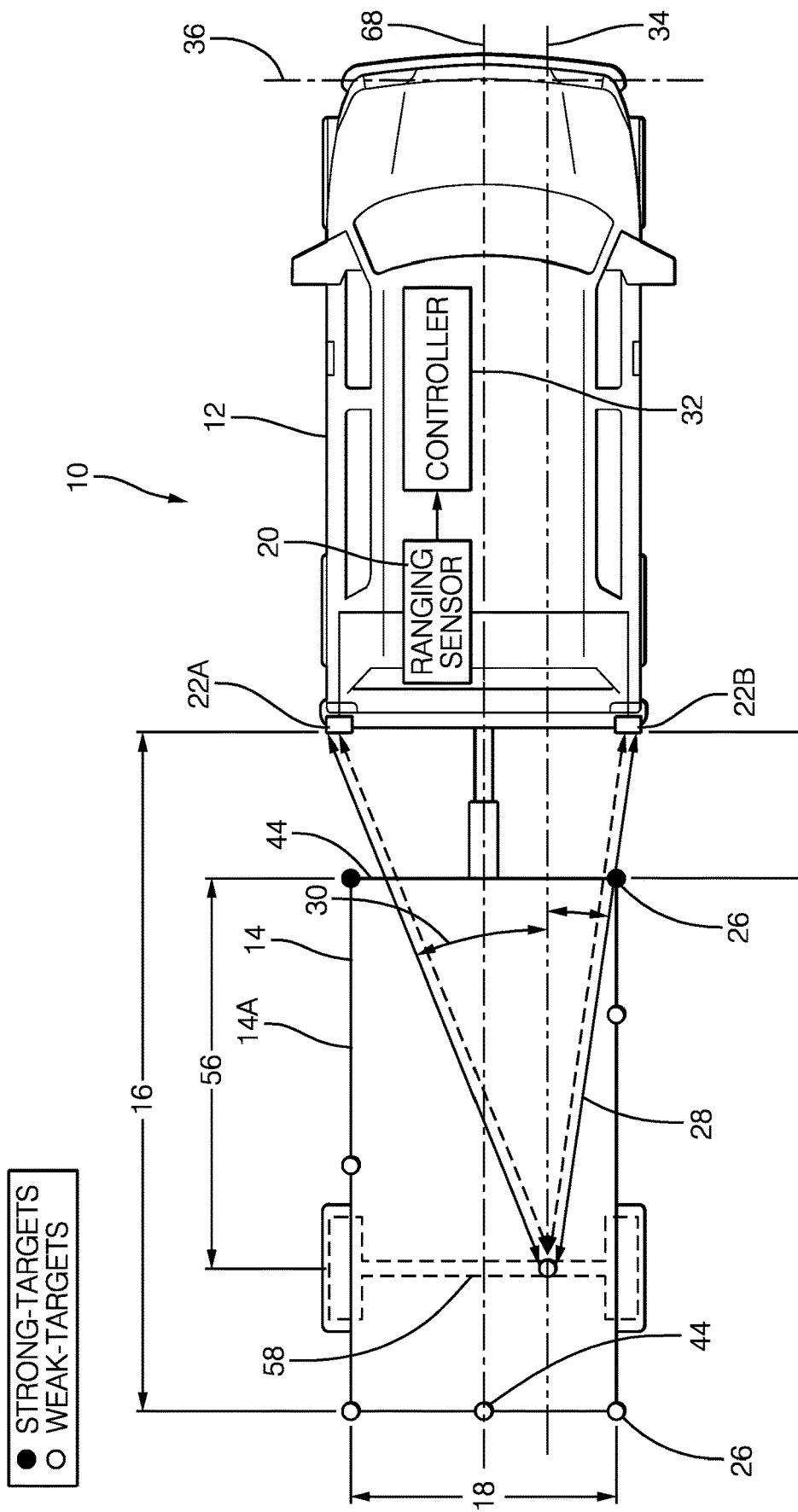
FIG. 2 is an illustration of the detection system of FIG. 1 in accordance with one embodiment.

FIG. 2 illustrates some of the types of targets located on the cargo-trailer 14A detected by the radar-sensor. By way of example and not limitation, the radar-sensor may be configured to output a continuous or periodic data stream that includes a variety of signal characteristics associated with each target detected. The signal characteristics may include or be indicative of, but are not limited to, the range to the detected-target from the host-vehicle 12, the azimuth-angle 30 to the detected-target relative to a host-vehicle-longitudinal-axis 34, an amplitude (not shown) of the radar-signal, and a relative-velocity (not shown) of closure relative to the detected-target. A target is generally detected because the radar-signal from the detected-target has sufficient signal strength to meet a predetermined threshold. That is, there may be targets that reflect the radar-signal, but the strength of the radar-signal is insufficient to be characterized as one of the detected-targets. Data that corresponds to a strong-target will generally be from consistent, non-intermittent signals. However, data that corresponds to a weak-target may be intermittent or have some substantial variability due to a low signal-to-noise ratio.

Returning to FIG. 1, the system 10 also includes the controller-circuit 32 in communication with the ranging-sensor 20. The ranging-sensor 20 may be hardwired to the controller-circuit 32 through the host-vehicle's 12 electrical-system (not shown), or may communicate through a wireless network (not shown). The controller-circuit 32 may include a processor (not shown) such as a microprocessor or other control circuitry such as analog and/or digital control circuitry including an application specific integrated circuit (ASIC) for processing data as should be evident to those in the art. The controller-circuit 32 may include a memory (not specifically shown), including non-volatile memory, such as electrically erasable programmable read-only memory (EE-PROM) for storing one or more routines, thresholds, and captured data. The one or more routines may be executed by the processor to perform steps for detecting the objects 26 based on signals received by the controller-circuit 32 from the ranging-sensor 20 as described herein. The controller-circuit 32 is configured to determine that the cargo-trailer 14A is being towed by the host-vehicle 12 (i.e. determine a trailer-presence) using the known methods of zero-range-rate (ZRR) detection of targets that will be understood by those in the art.

Figure 3A:
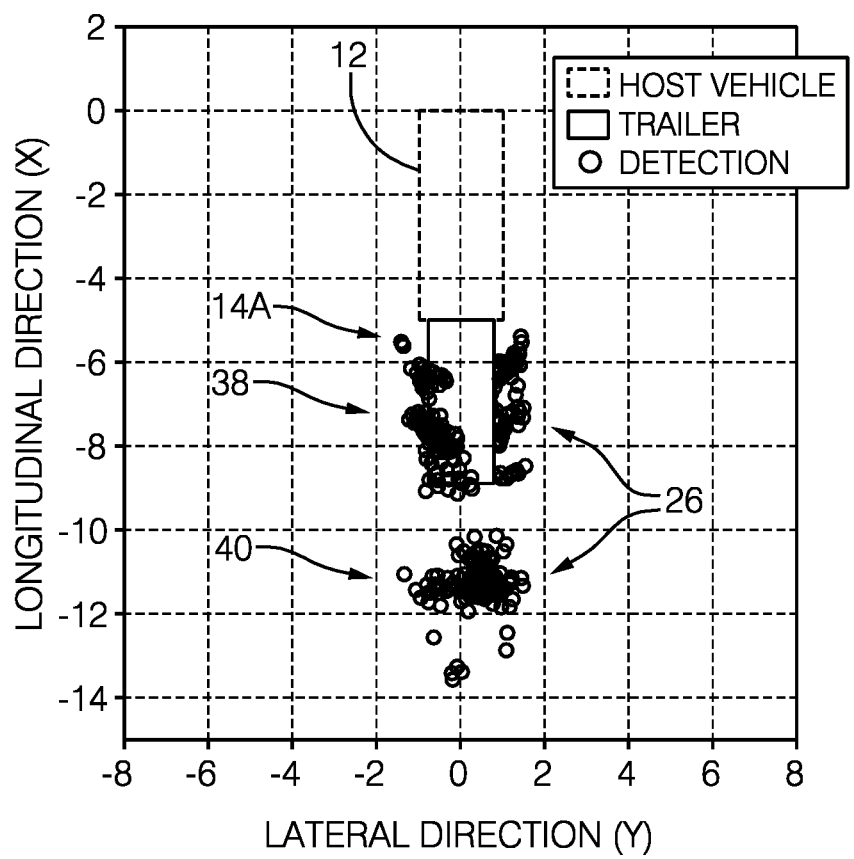
FIG. 3A is a plot of objects detected by the detection system of FIG. 1 in accordance with one embodiment.

FIG. 3A illustrates a plot of multiple radar-sensor data acquisition cycles that locate the ZRR targets along the host-vehicle-longitudinal-axis 34 and a host-vehicle-lateral-axis 36. Each data acquisition cycle consists of 64-detections per radar-sensor within a time interval of 50-milliseconds (50 ms), or a total of 128-detections for the two radar-sensors 22A and 22B. The data may be filtered to reduce noise by any of the known filtering methods, and in FIG. 3A the data has been filtered to 64-detections for the two radar-sensors 22A and 22B. The origin of the plot is located at a center of the host-vehicle's 12 front-bumper.

Figure 3B:
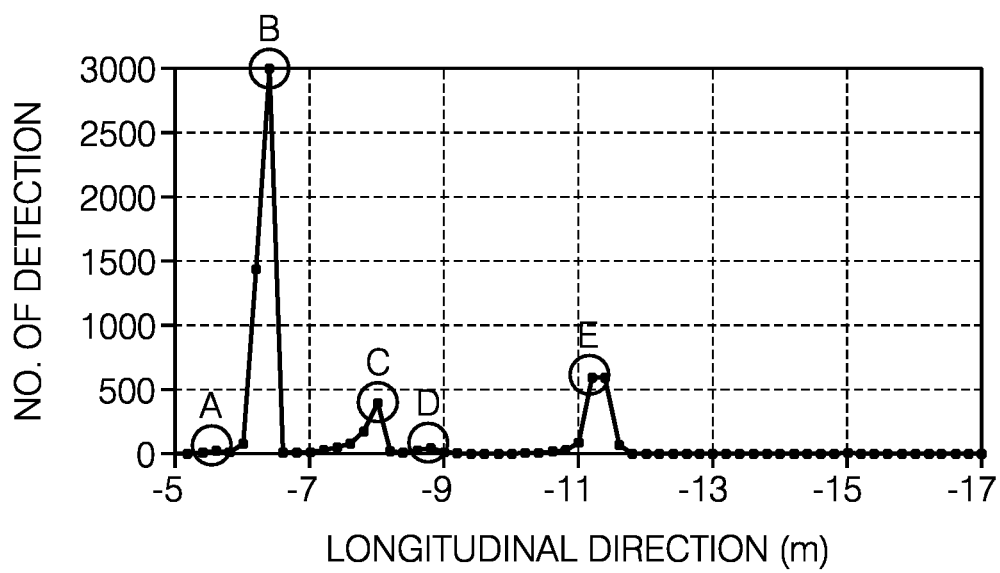
FIG. 3B is a plot of the objects of FIG. 3A in a longitudinal direction in accordance with one embodiment.

FIG. 3B illustrates a plot of the groups of the ZRR targets from FIG. 3A along the host-vehicle-longitudinal-axis 34 only. The groups represent the ZRR targets detected in increments of 0.2 meters (0.2 m) extending from a rear-end of the host-vehicle 12. For example, every 10 points along the x-axis of the plot in FIG. 3B represents 2.0 m of distance 28 from the rear-end of the 5 m long host-vehicle 12. The Y-axis in FIG. 3B represents the number of detections in a group. A total of 5 separate groups of detections are indicated by peaks in the plot and are labeled "A" through "E", with group A being closest to the host-vehicle 12 and group E being the furthest from the host-vehicle 12. Some of the groups represent real-objects 38 and others represent phantom-objects 40, as will be described below.

Figure 4A:
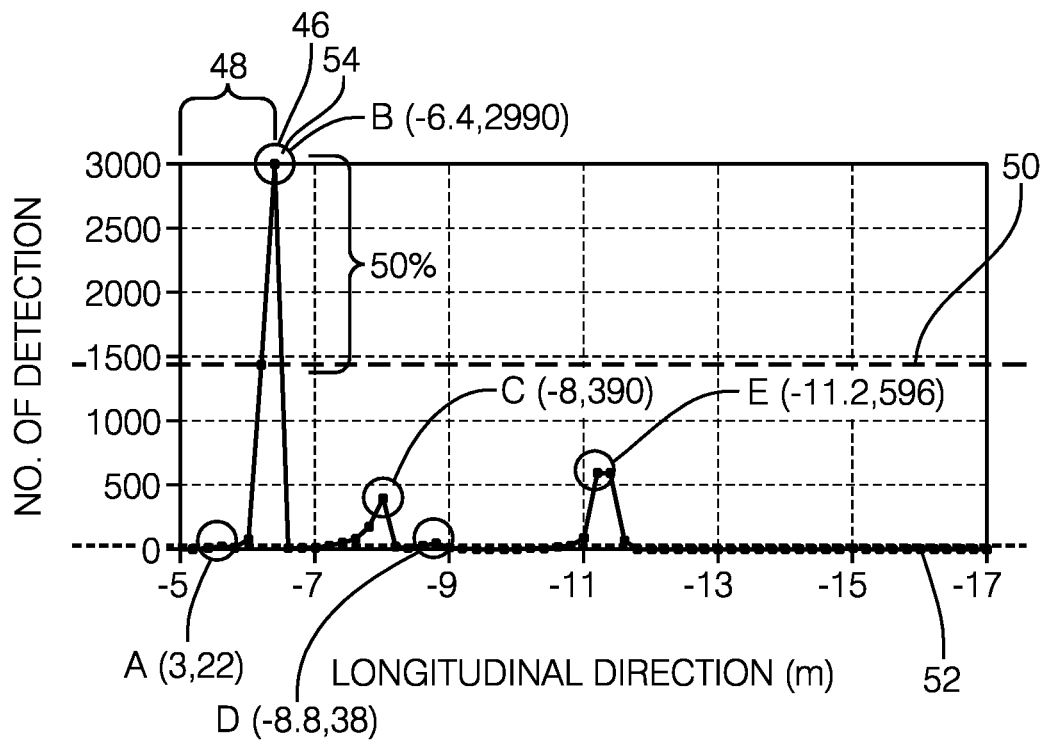
FIG. 4A is a plot of the objects in FIG. 3B in accordance with one embodiment.
Figure 4B:
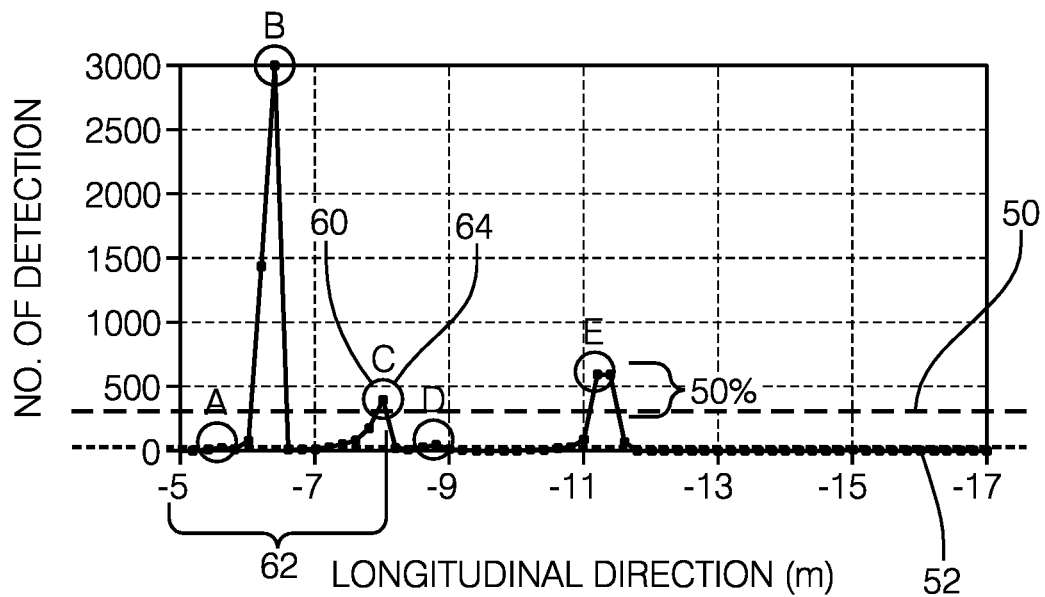
FIG. 4B is a plot of the objects in FIG. 3B in accordance with one embodiment.

FIGS. 4A-4B illustrate the plot of FIG. 3B with limits applied to filter out the phantom-objects 40. FIG. 4A also includes the X-Y coordinates of the peaks of each group. The controller-circuit 32 determines a trailer-distance 42 between the host-vehicle 12 and a front 44 of the cargo-trailer 14A based on the distance 28 to a first-group 46 of objects 26 detected by the ranging-sensor 20. That is, the controller-circuit 32 determines the distance 28 between a rear-end of the host-vehicle 12 and the front 44 of the cargo-trailer 14A based on a first major group of ZRR targets closest in proximity to the host-vehicle 12. The first-group 46 is characterized by a first-distance 48 indicated by the ranging-sensor 20. In order to distinguish the real-objects 38 from the phantom-objects 40 the controller-circuit 32 further determines a peak-threshold 50 that represents detections of real-objects 38 detected by the ranging-sensor 20, and a noise-threshold 52 that represents detections of phantom-objects 40 detected by the ranging-sensor 20, with the peak-threshold 50 being greater than the noise-threshold 52. The peak-threshold 50 and the noise-threshold 52 may be defined by the user and in the example illustrated in FIG. 4A the peak-threshold 50 is set to 50% of the largest group (i.e. group B) which is indicated by a dashed line at 1495-detections. The noise-threshold 52 is set to zero detections. The first-group 46 of objects 26 is determined by a first-detection-count 54 that is closer in magnitude to the peak-threshold 50 than to the noise-threshold 52, and is first closest in proximity to the host-vehicle 12. Each of the groups A through E are compared to both the peak-threshold 50 and to the noise-threshold 52 and a determination is made by the controller-circuit 32 whether each group is closer in magnitude to the peak-threshold 50 or closer to the noise-threshold 52. The groups that are closest to the noise-threshold 52 (i.e. groups A, C, D and E in FIG. 4A) are excluded from the determination of the first-group 46, leaving only group B. Thus, group B is classified as the first-group 46 and the first-distance 48 is determined to be 1.4 m from the rear-end of the host-vehicle 12.

The controller-circuit 32 further determines an axle-distance 56 between the front 44 of the cargo-trailer 14A and a trailer-axle 58 based on a second-group 60 of objects 26 detected by the ranging-sensor 20, as illustrated in FIG. 4B. That is, the controller-circuit 32 determines the distance 28 between the rear-end of the host-vehicle 12 and the trailer-axle 58 of the cargo-trailer 14A based on a second major group of ZRR targets behind the host-vehicle 12 that are farther from the host-vehicle 12 relative to the first-group 46. The second-group 60 is characterized by a second-distance 62 indicated by the ranging-sensor 20. The controller-circuit 32 sets the peak-threshold 50 to 50% of the largest group (i.e. group E) which is shown by the dashed line at 298-detections, and the noise-threshold 52 is set to zero detections. The second-group 60 of objects 26 is determined by a second-detection-count 64 that is closer in magnitude to the peak-threshold 50 than to the noise-threshold 52, and is second closest in proximity to the host-vehicle 12. Each of the groups C, D, and E are compared to both the peak-threshold 50 and to the noise-threshold 52 and a determination is made by the controller-circuit 32 whether each group is closer in magnitude to the peak-threshold 50 or closer to the noise-threshold 52. The groups that are closest to the noise-threshold 52 (i.e. group D in FIG. 4B) are excluded from the determination of the second-group 60, leaving only groups C and E. Thus, group C is classified as the second-group 60 because group C is second closest to the host-vehicle 12, and the second-distance 62 is determined to be 3 m from the rear-end of the host-vehicle 12. The controller-circuit 32 subtracts the first-distance 48 from the second-distance 62 to obtain the axle-distance 56, which is 1.6 m in the example illustrated in FIG. 4B.

The controller-circuit 32 further determines the trailer-length 16 based on the trailer-distance 42 and the axle-distance 56. The trailer-length 16 (TL) is determined by a formula including the trailer-distance 42 (Lo), the axle-distance 56 (L1), and a constant 66 (C) using the following formula:

$$TL = Lo + L1 + L1 * C$$

The constant 66, C, is in a range from 0.6 to 0.75, and was determined by the inventors based on known trailer-specifications and empirical data. Experimentation by the inventors has discovered that the constant 66, equal to 0.7 provides adequate estimation of the trailer-length 16 for a majority of the cargo-trailers 14A tested. Inserting the trailer-distance 42 and the axle-distance 56 into the above equation yields a trailer-length 16 estimation of:

$$TL = 1.4 \text{ m} + 1.6 \text{ m} + (1.6 \text{ m} * 0.7) = 4.12 \text{ m}$$

The known-length of the cargo-trailer 14A in the example illustrated in FIG. 4B is 3.9 m and indicates an error of 0.22 m. The error may be reduced by increasing the resolution (i.e. reducing the spacing) of the longitudinal groups along the host-vehicle-longitudinal-axis 34, which are 0.2 m in the above example. Experimentation by the inventors has discovered that the 0.2 m spacing provides an adequate balance of memory utilization requirements and measurement error.

Figure 5A:
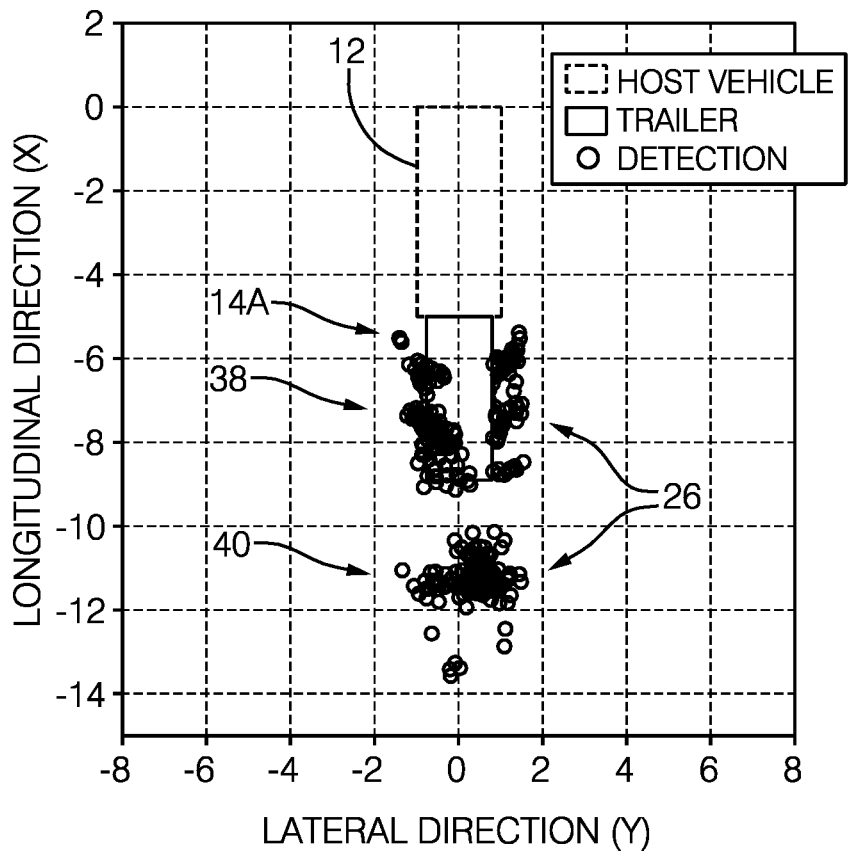
FIG. 5A is a plot of objects detected by the detection system of FIG. 1 in accordance with one embodiment.
Figure 5B:
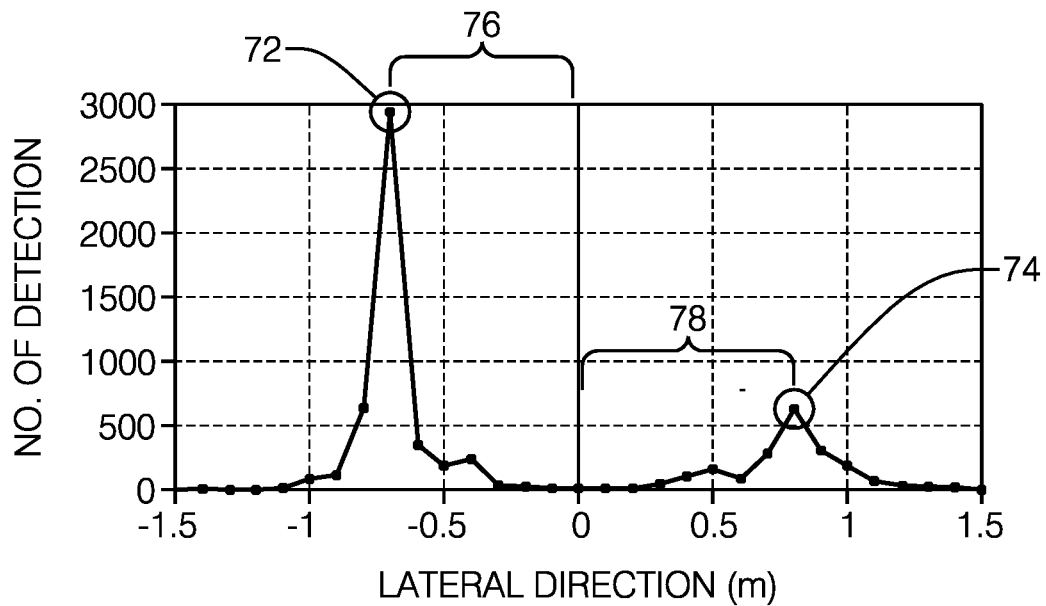
FIG. 5B is a plot of the objects of FIG. 5A in a lateral direction in accordance with one embodiment.

FIG. 5B illustrates a plot of the groups of the ZRR targets from FIG. 5A along the host-vehicle-lateral-axis 36 transverse to the host-vehicle-longitudinal-axis 34. The groups represent the ZRR targets detected in increments of 0.1 m extending from a centerline 68 of the host-vehicle 12 in a lateral direction. For example, every 10 points along the x-axis of the plot in FIG. 5B represents 1.0 m of distance 28 from the centerline 68 of the host-vehicle 12. The centerline 68 is indicated by zero on the Y-axis of FIGS. 5A-5B and is parallel with the host-vehicle-longitudinal-axis 34. The Y-axis in FIG. 5B represents the number of detections in a group.

The controller-circuit 32 further determines the trailer-width 18 of the trailer 14 by the distance 28 between a third-group 72 and a fourth-group 74 of objects 26 detected by the ranging-sensor 20. The third-group 72 is characterized by a first-lateral-offset 76 relative to the centerline 68 of the host-vehicle 12 as indicated by the ranging-sensor 20, and the fourth-group 74 is characterized by a second-lateral-offset 78 relative to the centerline 68 of the host-vehicle 12 as indicated by the ranging-sensor 20. The third-group 72 and the fourth-group 74 are identified by the controller-circuit 32 as the groups having the greatest number of ZRR detections on a left-side and a right-side of the centerline 68, and no filtering of the phantom-objects 40 is required. In the example illustrated in FIG. 5B, the estimated trailer-width 18 is 1.5 m compared to the known-width of 1.52 m, and indicates an error of 0.02 m. The error may be reduced by increasing the resolution (i.e. reducing the spacing) of the lateral groups, which are 0.1 m in the above example. Experimentation by the inventors has discovered that the 0.1 m spacing provides an adequate balance of memory utilization requirements and measurement error.

The system 10 may exclude any detections that are beyond a typical maximum trailer-dimension of 2.44 m×15.24 m.

Figure 6:
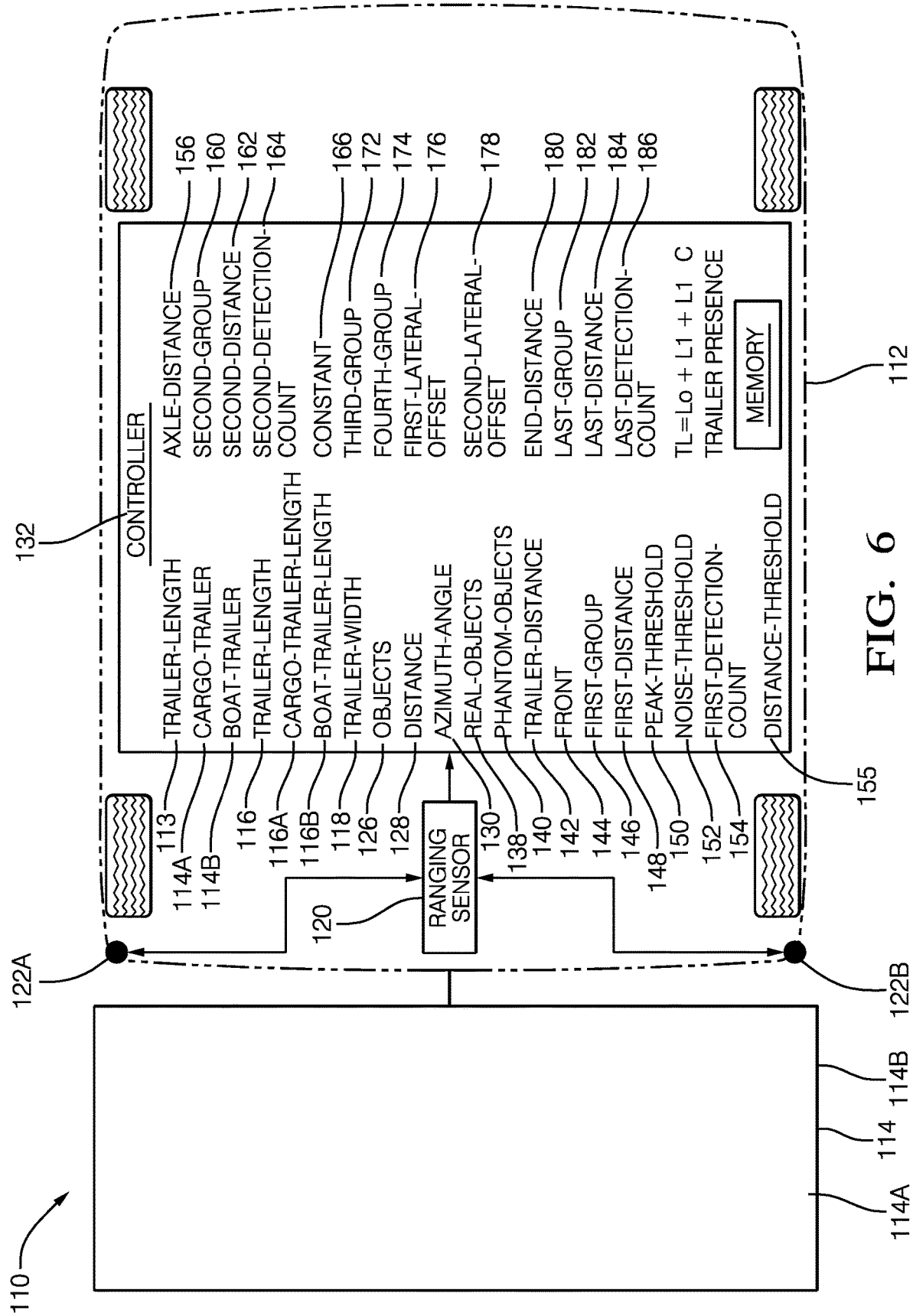
FIG. 6 is an illustration of a detection system in accordance with another embodiment.

FIG. 6 illustrates another embodiment of a detection system 110, hereafter referred to as the system 110, installed on a host-vehicle 112 towing a trailer 114. As will be described in more detail below, the system 110 is an improvement over other detection systems because the system 110 determines a trailer-type 113, a trailer-length 116 and a trailer-width 118 based on detected targets by filtering out erroneous detections. The trailer 114 may be a cargo-trailer 114A that may be an enclosed-type with solid panels, or may be an open-type with an exposed frame. The trailer 114 may also be a boat-trailer 114B. The boat-trailer 114B may, or may not, be carrying a boat, and may present a unique ranging-sensor-signal or signal-pattern compared to the cargo-trailer 114A that may further assist in a determination of the type of trailer 114 being towed by the host-vehicle 112.

The system 110 includes a ranging-sensor 120. The ranging-sensor 120 may be a radar-sensor 122 or a lidar-sensor 124 as will be understood by those in the art. The ranging-sensor 120 is configured to detect objects 126 proximate to the host-vehicle 112. In the example illustrated in FIG. 6, the ranging-sensor 120 is the radar-sensor 122. The radar-sensor 122 detects a radar-signal (not specifically shown) that is reflected by features of the trailer 114 towed by the host-vehicle 112. Typically, radar-systems on vehicles are capable of only determining a distance 128 (i.e. range) and azimuth-angle 130 to the target so may be referred to as a two-dimensional (2D) radar-system. Other radar-systems are capable of determining an elevation-angle to the target so may be referred to as a three-dimensional (3D) radar-system. In the non-limiting example illustrated in FIG. 6, the 2D radar-sensor 122 includes a left-sensor 122A and a right-sensor 122B. It is contemplated that the teachings presented herein are applicable to both 2D radar-systems and 3-D radar-systems with one or more sensor devices, i.e. multiple instances of the radar-sensor 122. The radar-sensor 122 is generally configured to detect the radar-signal that may include data indicative of the detected-target present on the trailer 114. As used herein, the detected-target present on the trailer 114 may be a feature of the trailer 114 that is detected by the radar-sensor 122 and tracked by a controller-circuit 132, as will be described below.

Figure 7:
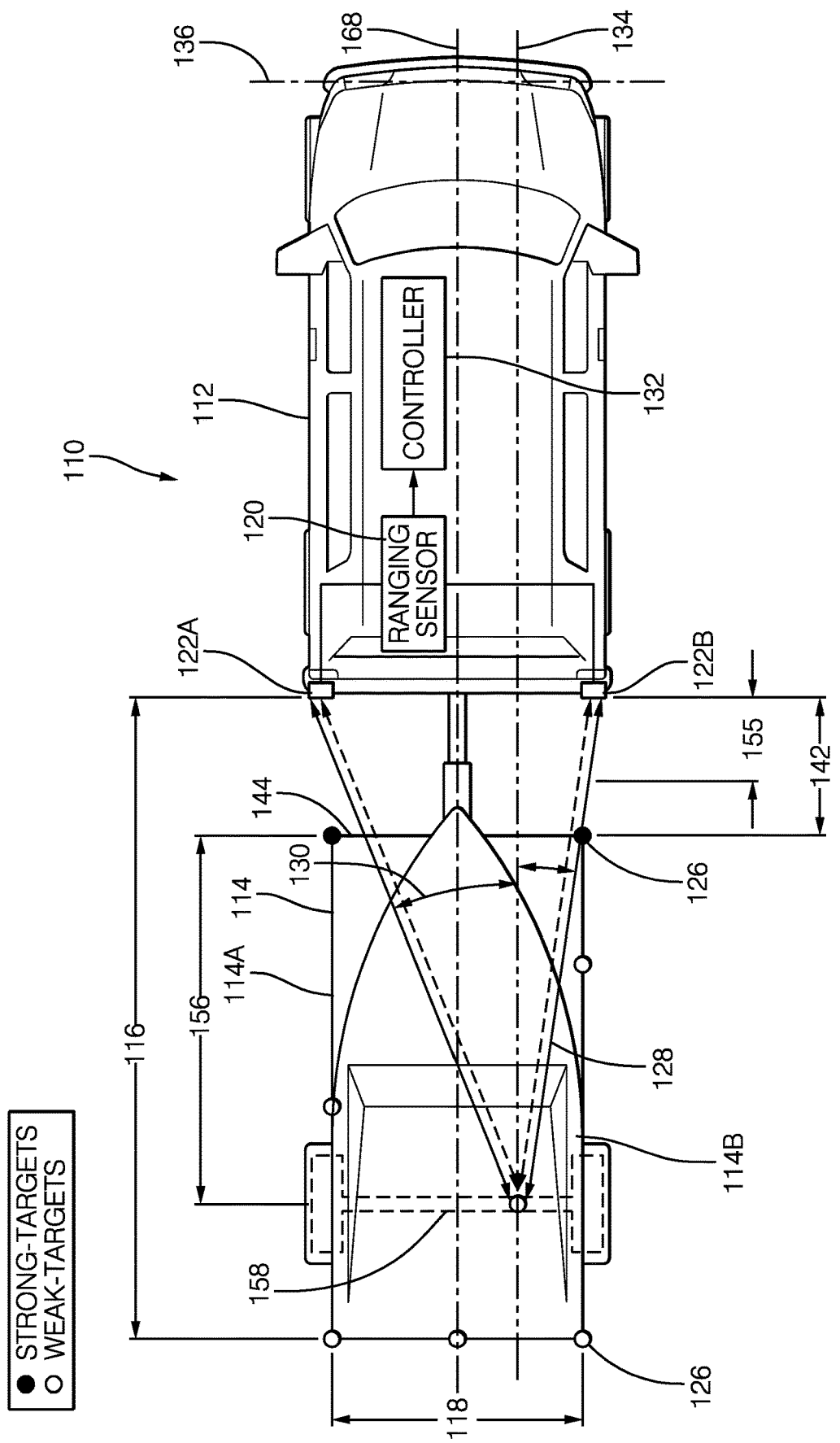
FIG. 7 is an illustration of the detection system of FIG. 6 in accordance with another embodiment.

FIG. 7 illustrates some of the various types of targets located on the trailer 114 detected by the radar-sensor 122. By way of example and not limitation, the radar-sensor 122 may be configured to output a continuous or periodic data stream that includes a variety of signal characteristics associated with each target detected. The signal characteristics may include or be indicative of, but are not limited to, the range to the detected-target from the host-vehicle 112, the azimuth-angle 130 to the detected-target relative to a host-vehicle-longitudinal-axis 134, an amplitude (not shown) of the radar-signal, and a relative-velocity (not shown) of closure relative to the detected-target. A target is generally detected because the radar-signal from the detected-target has sufficient signal strength to meet some predetermined threshold. That is, there may be targets that reflect the radar-signal, but the strength of the radar-signal is insufficient to be characterized as one of the detected-targets. Data that corresponds to a strong-target will generally be from consistent, non-intermittent signals. However, data that corresponds to a weak-target may be intermittent or have some substantial variability due to a low signal-to-noise ratio.

The system 110 also includes the controller-circuit 132 in communication with the ranging-sensor 120. The ranging-sensor 120 may be hardwired to the controller-circuit 132 through the host-vehicle's 112 electrical-system (not shown), or may communicate through a wireless network (not shown). The controller-circuit 132 may include a processor (not shown) such as a microprocessor or other control circuitry such as analog and/or digital control circuitry including an application specific integrated circuit (ASIC) for processing data as should be evident to those in the art. The controller-circuit 132 may include a memory (not specifically shown), including non-volatile memory, such as electrically erasable programmable read-only memory (EEPROM) for storing one or more routines, thresholds, and captured data. The one or more routines may be executed by the processor to perform steps for detecting the objects 126 based on signals received by the controller-circuit 132 from the ranging-sensor 120 as described herein. The controller-circuit 132 is configured to determine that the trailer 114 is being towed by the host-vehicle 112 (i.e. determine a trailer-presence) using the known methods of zero-range-rate (ZRR) detection of targets that will be understood by those in the art.

Figure 8A:
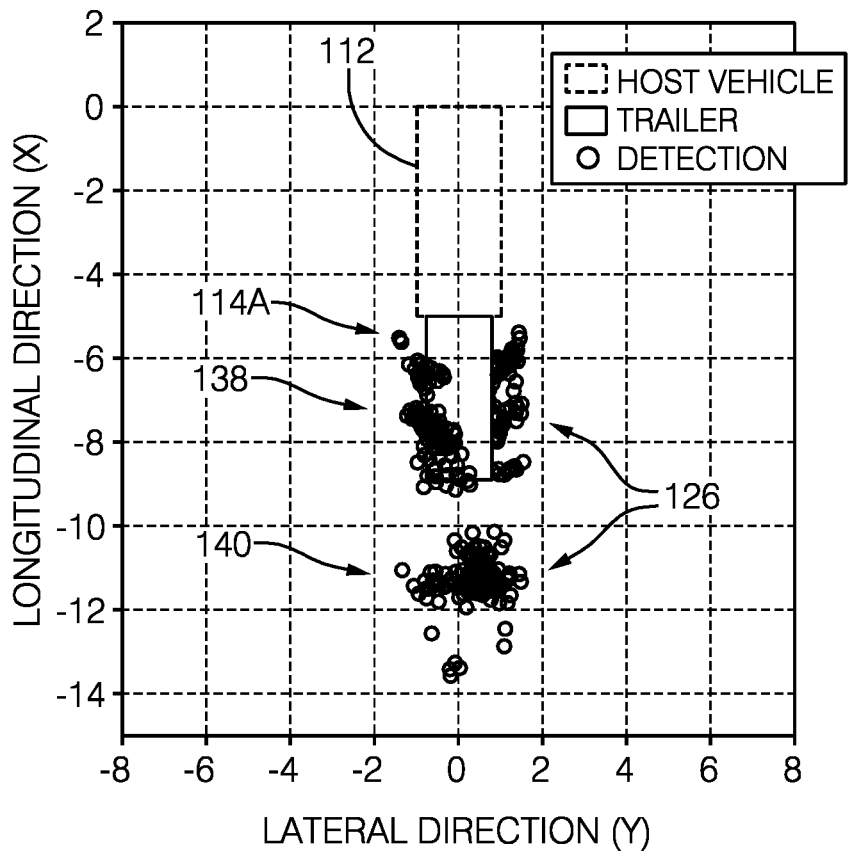
FIG. 8A is a plot of objects detected by the detection system of FIG. 6 in accordance with another embodiment.

FIG. 8A illustrates a plot of multiple radar-sensor 122 data acquisition cycles that locate the ZRR targets along the host-vehicle-longitudinal-axis 134 and a host-vehicle-lateral-axis 136. Each data acquisition cycle consists of 64-detections per radar-sensor 122 within a time interval of 50-milliseconds (50 ms), or a total of 128-detections for the two radar-sensors 122A and 122B. The data may be filtered to reduce noise by any of the known filtering methods, and in FIG. 8A has been filtered to 64-detections for the two radar-sensors 122A and 122B. The origin of the plot is located at a center of the host-vehicle's 112 front-bumper.

Figure 8B:
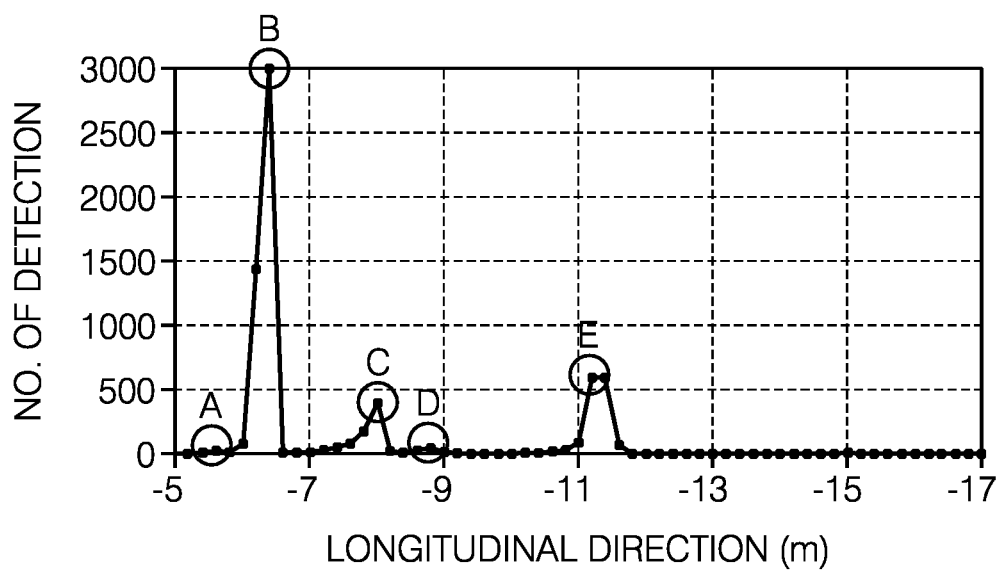
FIG. 8B is a plot of the objects of FIG. 8A in a longitudinal direction in accordance with another embodiment.

FIG. 8B illustrates a plot of the groups of the ZRR targets from FIG. 8A along the host-vehicle-longitudinal-axis 134 only. The groups represent the ZRR targets detected in increments of 0.2 meters (0.2 m) extending from a rear-end of the host-vehicle 112. For example, every 10 points along the x-axis of the plot in FIG. 8B represents 2.0 m of distance 128 from the rear-end of the 5 m long host-vehicle 112. The Y-axis in FIG. 8B represents the number of detections in a group. A total of 5 separate groups of detections are indicated by peaks in the plot and are labeled "A" through "E", with group A being closest to the host-vehicle 112 and group E being the furthest from the host-vehicle 112. Some of the groups represent real-objects 138 and others represent phantom-objects 140, as will be described below.

Figure 9A:
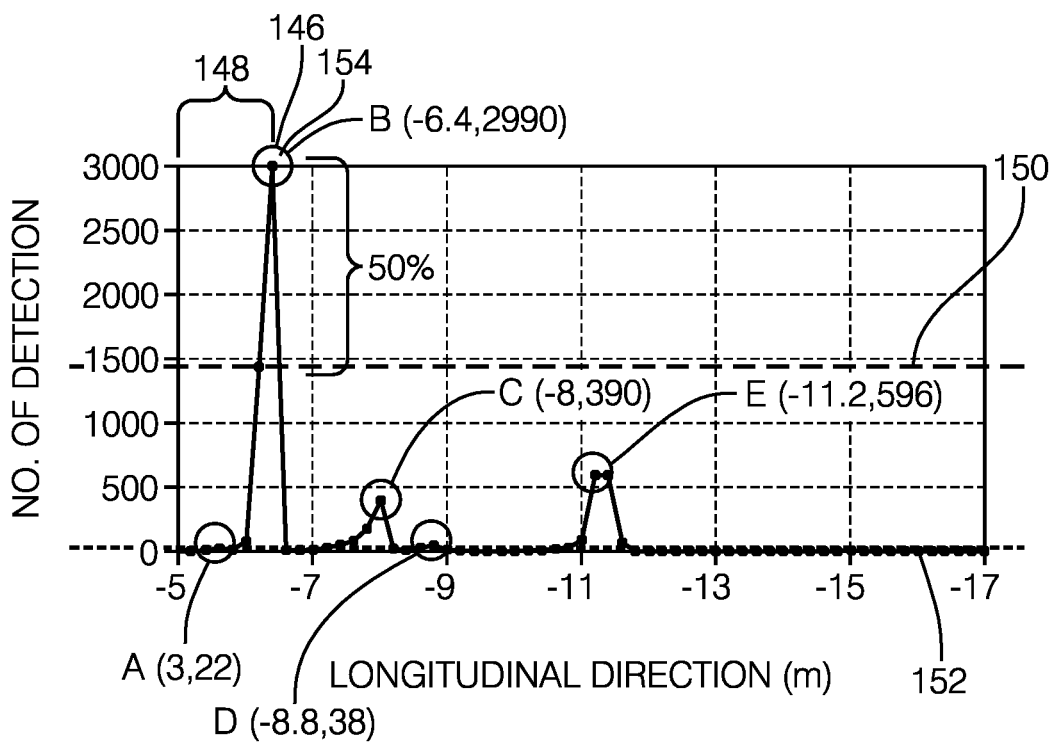
FIG. 9A is a plot of the objects in FIG. 8B in accordance with another embodiment.
Figure 9B:
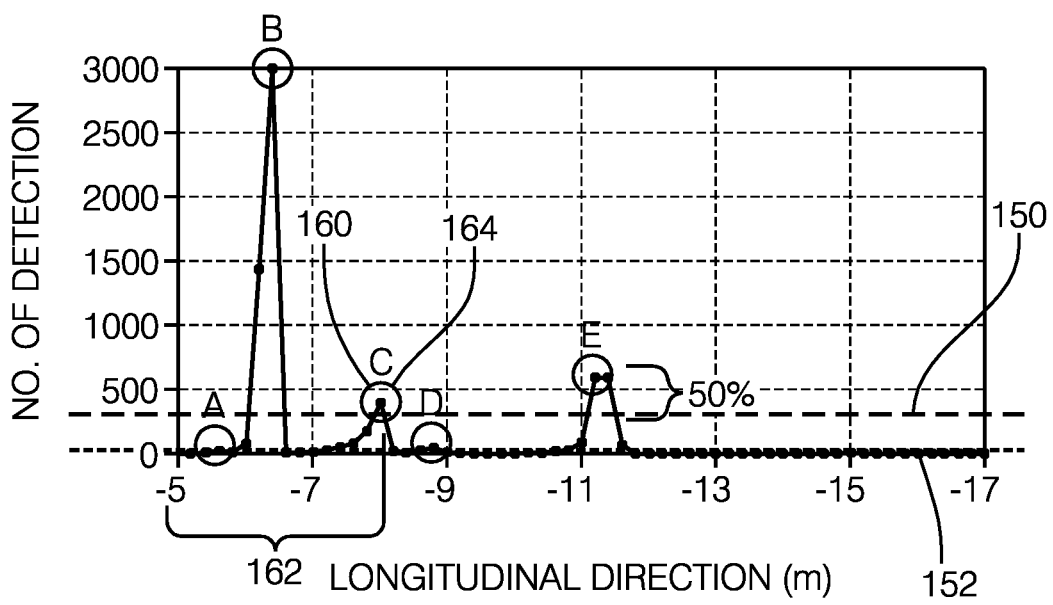
FIG. 9B is a plot of the objects in FIG. 8B in accordance with another embodiment.

FIGS. 9A-9B illustrate the plot of FIG. 8B with limits applied to filter out the phantom-objects 140. FIG. 9A also includes the X-Y coordinates of the peaks of each group. The controller-circuit 132 determines a trailer-distance 142 between the host-vehicle 112 and a front 144 of the trailer 114 based on the distance 128 to a first-group 146 of objects 126 detected by the ranging-sensor 120. That is, the controller-circuit 132 determines the distance 128 between a rear-end of the host-vehicle 112 and the front 144 of the trailer 114 based on a first major group of ZRR targets closest to the host-vehicle 112. The first-group 146 is characterized by a first-distance 148 indicated by the ranging-sensor 120. In order to distinguish the real-objects 138 from the phantom-objects 140 the controller-circuit 132 further determines a peak-threshold 150 that represents detections of real-objects 138 detected by the ranging-sensor 120, and a noise-threshold 152 that represents detections of phantom-objects 140 detected by the ranging-sensor 120, with the peak-threshold 150 being greater than the noise-threshold 152. The peak-threshold 50 and the noise-threshold 52 may be defined by the user and in the example illustrated in FIG. 9A, the peak-threshold 150 is set to 50% of the largest group (i.e. group B) which is indicated by a dashed line at 1495-detections, and the noise-threshold 152 is set to zero-detections. The first-group 146 of objects 126 is determined by a first-detection-count 154 that is closer in magnitude to the peak-threshold 150 than to the noise-threshold 152, and is first closest in proximity to the host-vehicle 112. Each of the groups A through E are compared to both the peak-threshold 150 and to the noise-threshold 152 and a determination is made by the controller-circuit 132 whether each group is closer in magnitude to the peak-threshold 150 or to the noise-threshold 152. The groups that are closest to the noise-threshold 152 (i.e. groups A, C, D and E in FIG. 9A) are excluded from the determination of the first-group 146, leaving only group B. Thus, group B is classified as the first-group 146 and the first-distance 148 is determined to be 1.4 m from the rear-end of the host-vehicle 12.

The controller-circuit 132 determines the trailer-type 113 being towed by the host-vehicle 112 based on a comparison of the trailer-distance 142 to a distance-threshold 155. The trailer-type 113 is characterized as a cargo-trailer 114A in accordance with a determination that the trailer-distance 142 is less than the distance-threshold 155 that is in a range of 2 m to 3 m. The trailer-type 113 is characterized as the boat-trailer 114B in accordance with the determination that the trailer-distance 142 is greater than the distance-threshold 155. Experimentation by the inventors has discovered that the distance-threshold 155 of 3 m provides adequate results in distinguishing between the cargo-trailer 114A and the boat-trailer 114B.

In accordance with the determination that the trailer-type 113 is characterized as the cargo-trailer 114A, the controller-circuit 132 further determines an axle-distance 156 between the front 144 of the trailer 114 and a trailer-axle 158 based on a second-group 160 of objects 126 detected by the ranging-sensor 120, as illustrated in FIG. 9B. That is, the controller-circuit 132 determines the distance 128 between the rear-end of the host-vehicle 112 and the trailer-axle 158 of the cargo-trailer 114A based on a second major group of ZRR targets behind the host-vehicle 112 that are farther from the host-vehicle 112 relative to the first-group 146. The second-group 160 is characterized by a second-distance 162 indicated by the ranging-sensor 120. The controller-circuit 132 sets the peak-threshold 150 to 50% of the largest group (i.e. group E) which is indicated by the dashed line at 298-detections, and the noise-threshold 152 is set to zero-detections. The second-group 160 of objects 126 is determined by a second-detection-count 164 that is closer in magnitude to the peak-threshold 150 than to the noise-threshold 152, and is second closest in proximity to the host-vehicle 112. Each of the groups C, D, and E are compared to both the peak-threshold 150 and to the noise-threshold 152 and a determination is made by the controller-circuit 132 whether each group is closer in magnitude to the peak-threshold 150 or closer to the noise-threshold 152. The groups that are closest to the noise-threshold 152 (i.e. group D in FIG. 9B) are excluded from the determination of the second-group 160, leaving only groups C and E. Thus, group C is classified as the second-group 160 because group C is second closest to the host-vehicle 112, and the second-distance 162 is determined to be 3 m from the rear-end of the host-vehicle 112. The controller-circuit 132 subtracts the first-distance 148 from the second-distance 162 to obtain the axle-distance 156, which is 1.6 m in the example illustrated in FIG. 9B.

The controller-circuit 132 further determines a cargo-trailer-length 116A of the cargo-trailer 114A based on the trailer-distance 142 and the axle-distance 156. The cargo-trailer-length 116A (TL) is determined by a formula including the trailer-distance 142 (Lo), the axle-distance 156 (L1), and a constant 166 (C) using the following formula:

$$TL = Lo + L1 + L1*C$$

The constant 166, C, is in a range from 0.6 to 0.75, and was determined by the inventors based on known trailer 114 specifications and empirical data. Experimentation by the inventors has discovered that the constant 166, equal to 0.7 provides adequate estimation of the cargo-trailer-length 116A for a majority of cargo-trailers 114A tested. Inserting the trailer-distance 142 and the axle-distance 156 into the above equation yields the cargo-trailer-length 116A estimation of:

$$TL = 1.4 \text{ m} + 1.6 \text{ m} + (1.6 \text{ m} * 0.7) = 4.12 \text{ m}$$

The known-length of the cargo-trailer 114A in the example illustrated in FIG. 9B is 3.9 m and indicates an error of 0.22 m. The error may be reduced by increasing the resolution (i.e. reducing the spacing) of the longitudinal groups along the host-vehicle-longitudinal-axis 134, which are 0.2 m in the above example. Experimentation by the inventors has discovered that the 0.2 m spacing provides an adequate balance of memory utilization requirements and measurement error.

Figure 10A:
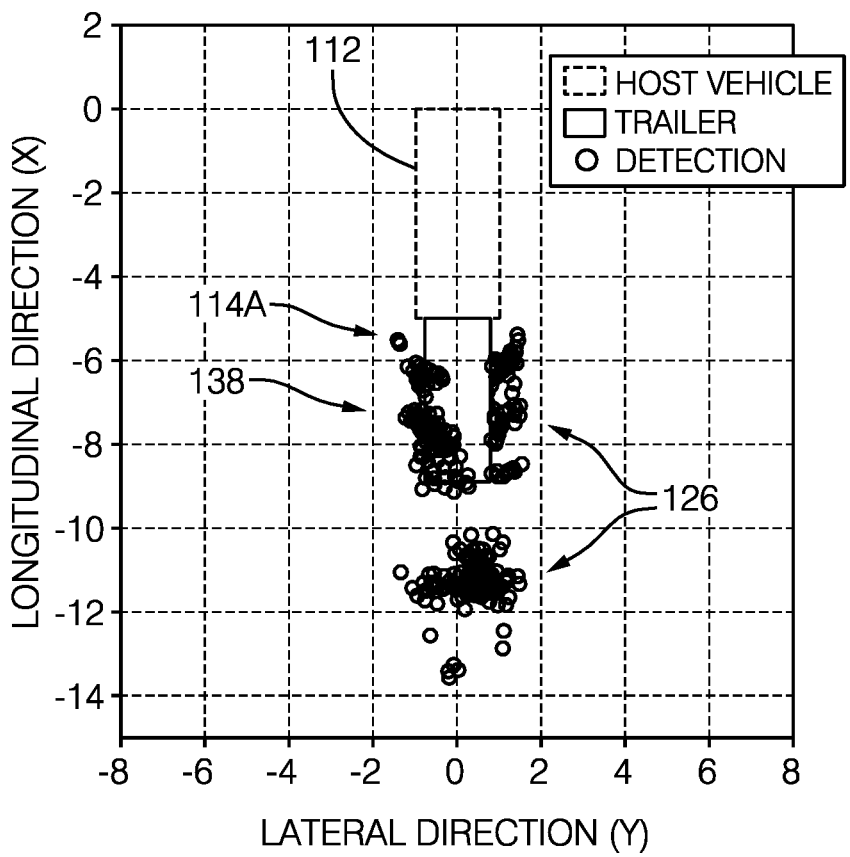
FIG. 10A is a plot of objects detected by the detection system of FIG. 6 in accordance with another embodiment.
Figure 10B:
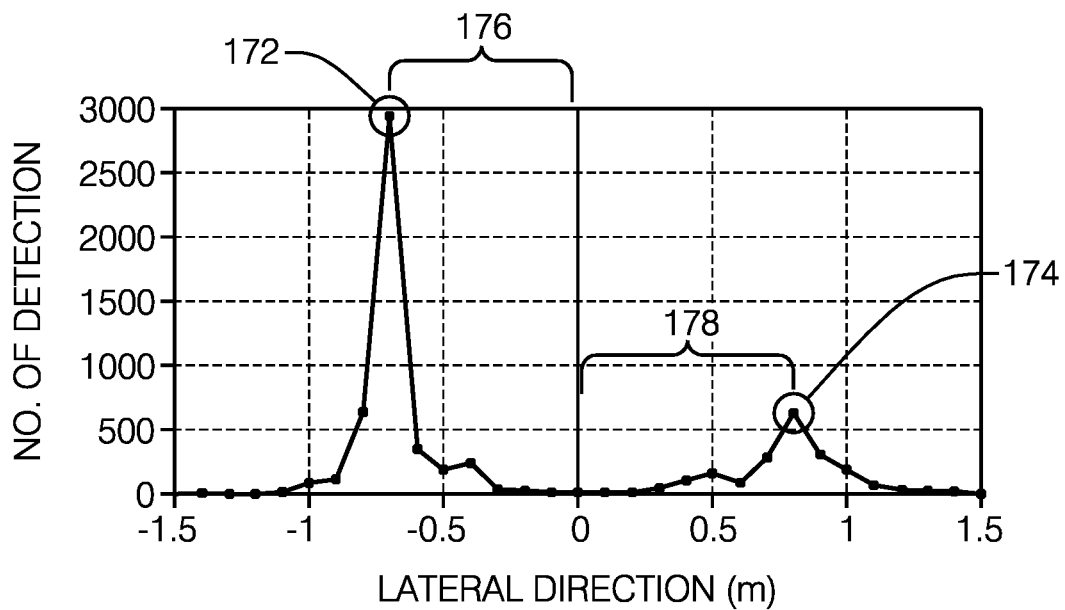
FIG. 10B is a plot of the objects of FIG. 10A in a lateral direction in accordance with another embodiment.

FIG. 10B illustrates a plot of the groups of the ZRR targets from FIG. 10A along the host-vehicle-lateral-axis 136 transverse to the host-vehicle-longitudinal-axis 134. The groups represent the ZRR targets detected in increments of 0.1 m extending from a centerline 168 of the host-vehicle 112 in a lateral direction. For example, every 10-points along the x-axis of the plot in FIG. 10B represents 1.0 m of distance 128 from the centerline 168 host-vehicle 112. The centerline 168 is indicated by zero on the Y-axis of FIGS. 10A-10B and is parallel with the host-vehicle-longitudinal-axis 134. The Y-axis in FIG. 10B represents the number of detections in a group.

The controller-circuit 132 further determines a trailer-width 118 of the cargo-trailer 114A by the distance 128 between a third-group 172 and a fourth-group 174 of objects 126 detected by the ranging-sensor 120. The third-group 172 is characterized by a first-lateral-offset 176 relative to the centerline 168 of the host-vehicle 112 as indicated by the ranging-sensor 120 and the fourth-group 174 is characterized by a second-lateral-offset 178 relative to the centerline 168 of the host-vehicle 112 as indicated by the ranging-sensor 120. The third-group 172 and the fourth-group 174 are identified by the controller-circuit 132 as the groups having the greatest number of detections on a left-side and a right-side of the centerline 168, and no filtering of phantom-objects 140 is required. In the example illustrated in FIG. 10B, the estimated trailer-width 118 is 1.5 m compared to the known-width of 1.52 m, and indicates an error of 0.02 m. The error may be reduced by increasing the resolution (i.e. reducing the spacing) of the lateral groups, which are 0.1 m in the above example. Experimentation by the inventors has discovered that the 0.1 m spacing provides an adequate balance of memory utilization requirements and measurement error.

Figure 11A:
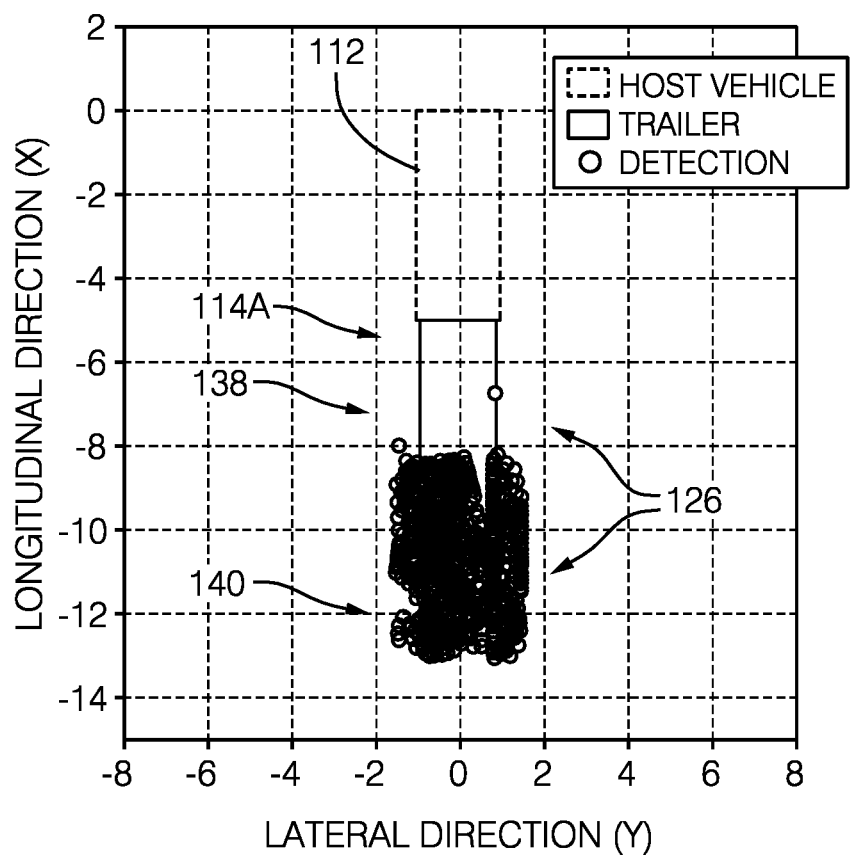
FIG. 11A is a plot of objects detected by the detection system of FIG. 6 in accordance with another embodiment.
Figure 11B:
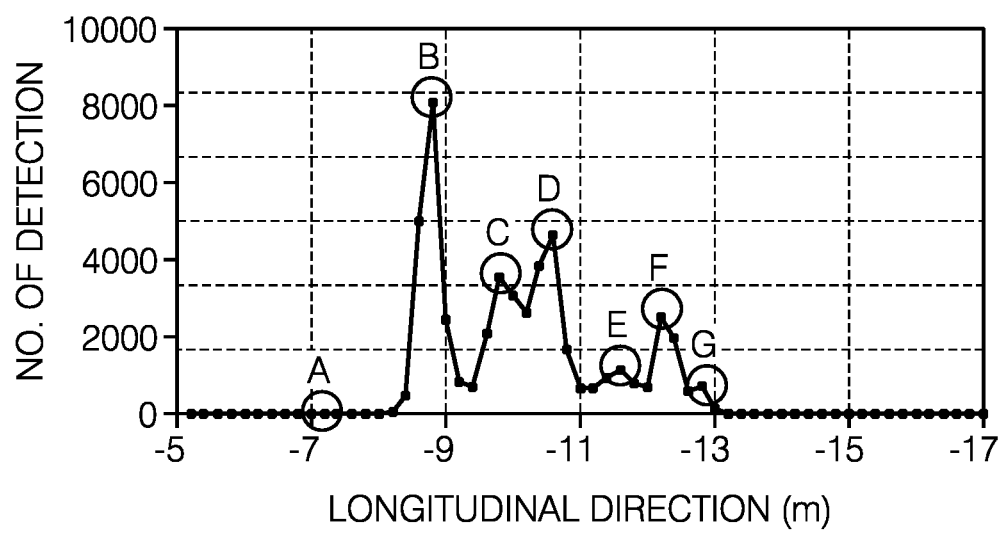
FIG. 11B is a plot of the objects of FIG. 11A in a longitudinal direction in accordance with another embodiment.

FIG. 11A illustrates a plot of multiple radar-sensor 122 data acquisition cycles for the boat-trailer 114B that locate the ZRR targets along the host-vehicle-longitudinal-axis 134 and the host-vehicle-lateral-axis 136. FIG. 11B illustrates a plot of the groups of the ZRR targets from FIG. 11A along the host-vehicle-longitudinal-axis 134 only. In accordance with the determination that the trailer-type 113 is characterized as the boat-trailer 114B the controller-circuit 132 further determines an end-distance 180 to an end of the boat-trailer 114B based on a last-group 182 of objects 126 detected by the ranging-sensor 120. The last-group 182 is characterized by a last-distance 184 indicated by the ranging-sensor 120 and the controller-circuit 132 determines a boat-trailer-length 116B based on the end-distance 180.

Figure 12A:
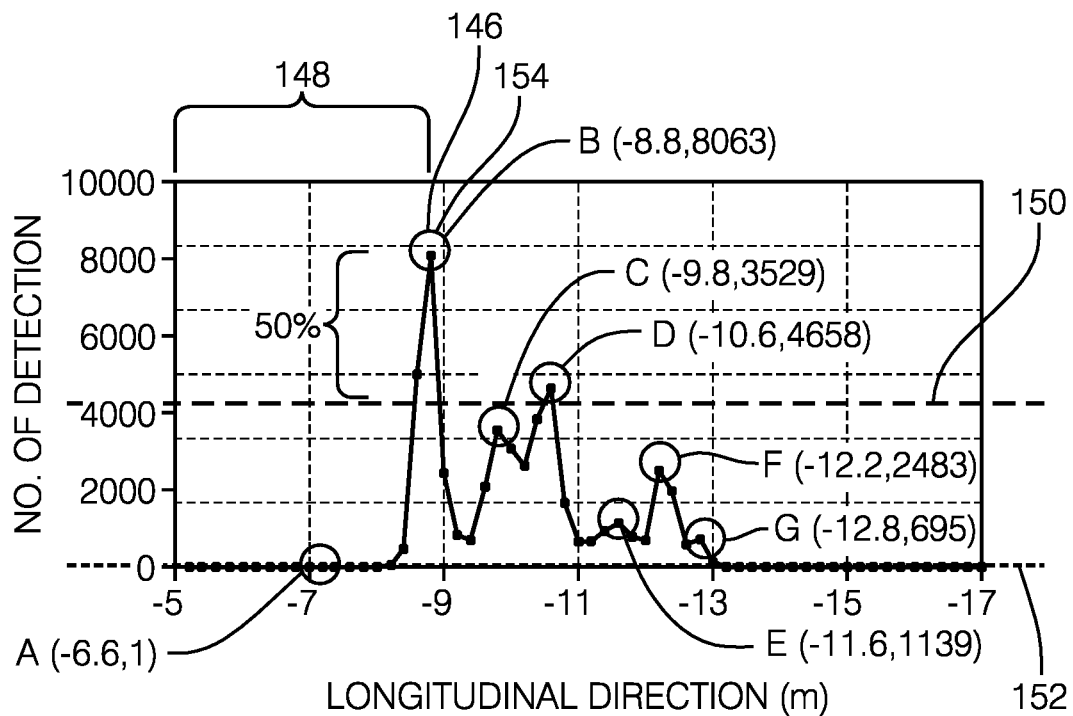
FIG. 12A is a plot of the objects in FIG. 11B in accordance with another embodiment.
Figure 12B:
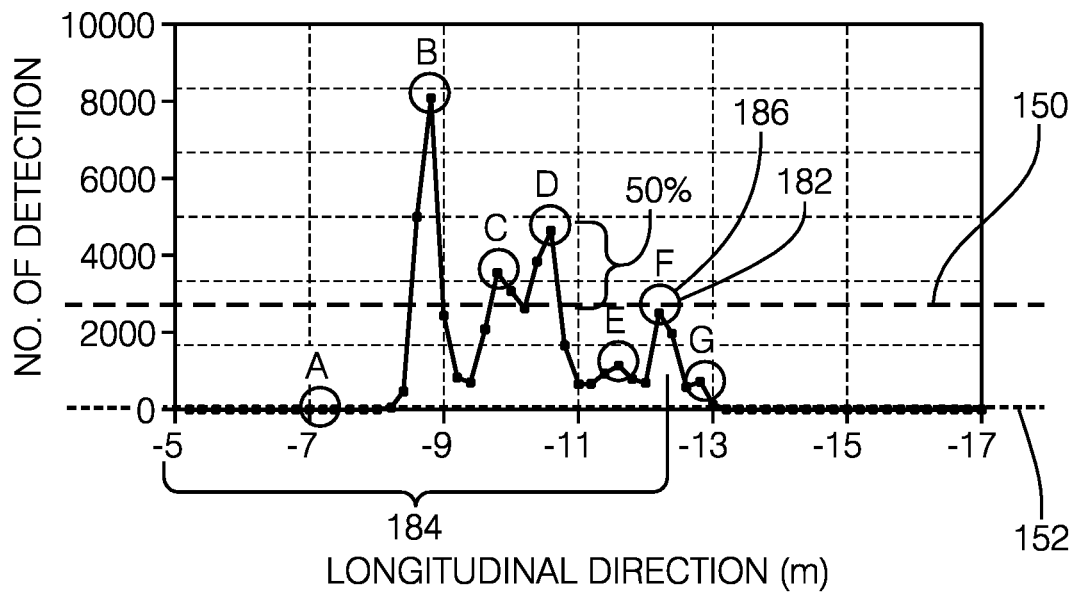
FIG. 12B is a plot of the objects in FIG. 11B in accordance with another embodiment.

FIGS. 12A-12B illustrate the plot of FIG. 11B with limits applied to filter out the phantom-objects 140 just as described for the cargo-trailer 114A above. FIG. 12A also includes the X-Y coordinates of the peaks of each group. The controller-circuit 132 determines the trailer-distance 142 between the host-vehicle 112 and the front 144 of the boat-trailer 114B based on the distance 128 to the first-group 146 of objects 126 detected by the ranging-sensor 120. That is, the controller-circuit 132 determines the distance 128 between a rear-end of the host-vehicle 112 and the front 144 of the boat-trailer 114B based on the first major group of ZRR targets closest to the host-vehicle 112. The first-group 146 is characterized by the first-distance 148 indicated by the ranging-sensor 120. In order to distinguish the real-objects 138 from the phantom-objects 140 the controller-circuit 132 further determines the peak-threshold 150 that represents detections of real-objects 138 detected by the ranging-sensor 120, and the noise-threshold 152 that represents detections of phantom-objects 140 detected by the ranging-sensor 120, with the peak-threshold 150 being greater than the noise-threshold 152. In the example illustrated in FIG. 12A, the peak-threshold 150 is set to 50% of the largest group (i.e. group B) which is indicated by a dashed line at 4031-detections, and the noise-threshold 152 is set to zero-detections. The first-group 146 of objects 126 is determined by the first-detection-count 154 that is closer in magnitude to the peak-threshold 150 than to the noise-threshold 152, and is first closest in proximity to the host-vehicle 112. Each of the groups A through G are compared to both the peak-threshold 150 and to the noise-threshold 152 and the determination is made by the controller-circuit 132 whether each group is closer in magnitude to the peak-threshold 150 or to the noise-threshold 152. The groups that are closest to the noise-threshold 152 (i.e. groups A, E and G in FIG. 12A) are excluded from the determination of the first-group 146, leaving groups B, C, D and F. Thus, group B is classified as the first-group 146 and the first-distance 148 is determined to be 3.8 m from the rear-end of the host-vehicle 12, which is located greater than the distance-threshold 155 of 3 m behind the host-vehicle 112 and determined to be the boat-trailer 114B.

In accordance with the determination that the trailer-type 113 is characterized as the boat-trailer 114B, the controller-circuit 32 further determines the last-group 182 of objects 126 (group-F) determined by a last-detection-count 186 that is closer in magnitude to the peak-threshold 150 than to the noise-threshold 152 and is farthest in proximity to the host-vehicle 112, as illustrated in FIG. 12B. The controller-circuit 132 sets the peak-threshold 150 to 50% of the largest group (i.e. group D) which is indicated by the dashed line at 2329-detections, and the noise-threshold 152 is set to zero-detections. The last-group 182 of objects 126 is determined by the last-detection-count 186 that is closer in magnitude to the peak-threshold 150 than to the noise-threshold 152, and is farthest in proximity to the host-vehicle 112. Each of the groups C, through G are compared to both the peak-threshold 150 and to the noise-threshold 152 and a determination is made by the controller-circuit 132 whether each group is closer in magnitude to the peak-threshold 150 or closer to the noise-threshold 152. The groups that are closest to the noise-threshold 152 (i.e. groups E and G in FIG. 12B) are excluded from the determination of the second-group 160, leaving only groups C, D and F. Thus, group F is classified as the last-group 182 because group F is farthest from the host-vehicle 112, and the last-distance 184 is determined to be 7.2 m from the rear-end of the host-vehicle 112. The boat-trailer-length 116B is estimated to be 7.2 m compared to the known-length of 7.2 m and indicates an error of 0.0 m.

Figure 13A:
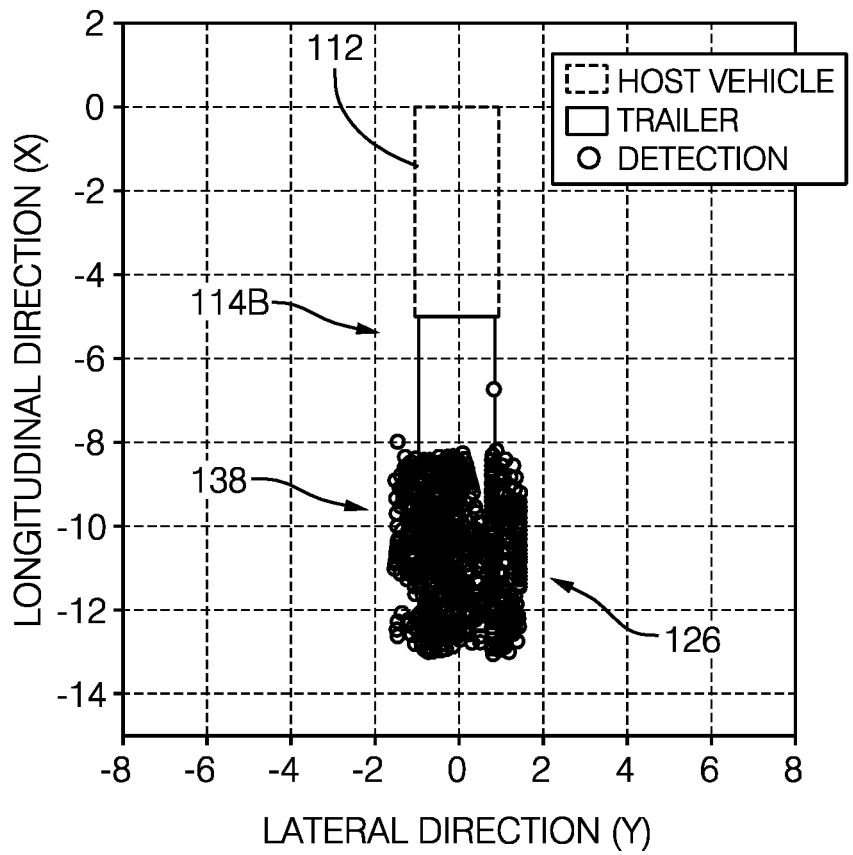
FIG. 13A is a plot of objects detected by the detection system of FIG. 6 in accordance with another embodiment.
Figure 13B:
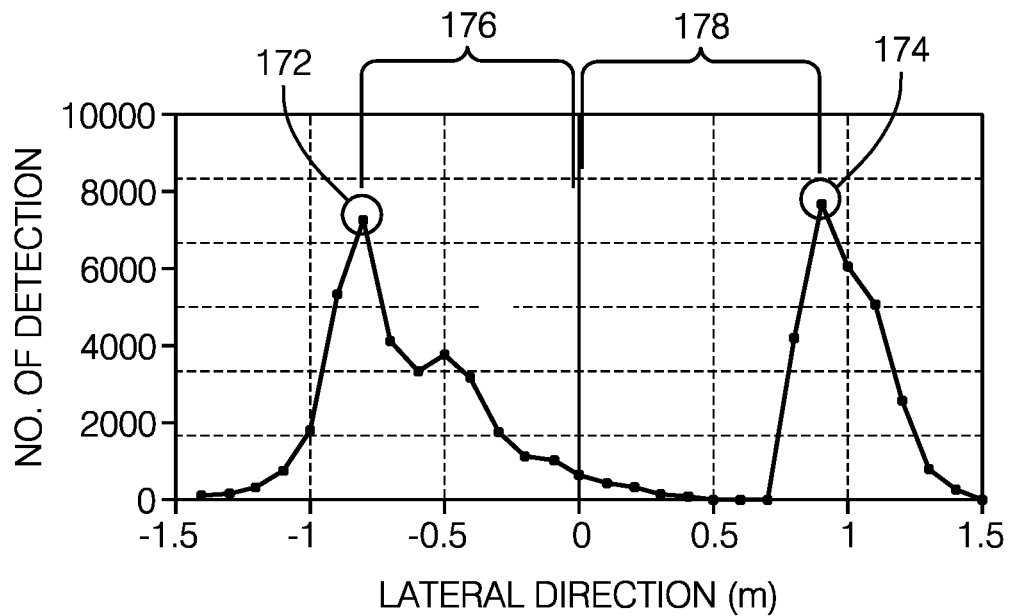
FIG. 13B is a plot of the objects of FIG. 13A in a lateral direction in accordance with another embodiment.

FIG. 13B illustrates a plot of the groups of the ZRR targets from FIG. 13A along the host-vehicle-lateral-axis 136 transverse to the host-vehicle-longitudinal-axis 134. The groups represent the ZRR targets detected in increments of 0.1 m extending from the centerline 168 of the host-vehicle 112 in the lateral direction. For example, every 10-points along the x-axis of the plot in FIG. 13B represents 1.0 m of distance 128 from the centerline 168 host-vehicle 112. The centerline 168 is indicated by zero on the Y-axis of FIGS. 13A-13B and is parallel with the host-vehicle-longitudinal-axis 134. The Y-axis in FIG. 13B represents the number of detections in a group.

The controller-circuit 132 further determines the trailer-width 118 of the boat-trailer 114B by the distance 128 between the third-group 172 and the fourth-group 174 of objects 126 detected by the ranging-sensor 120. The third-group 172 is characterized by the first-lateral-offset 176 relative to the centerline 168 of the host-vehicle 112 as indicated by the ranging-sensor 120, and the fourth-group 174 is characterized by the second-lateral-offset 178 relative to the centerline 168 of the host-vehicle 112 as indicated by the ranging-sensor 120. The third-group 172 and the fourth-group 174 are identified by the controller-circuit 132 as the groups having the greatest number of detections on the left-side and the right-side of the centerline 168, and no filtering of phantom-objects 140 is required. In the example illustrated in FIG. 13B, the estimated trailer-width 118 is 1.7 m compared to the known-width of 1.9 m, and indicates an error of 0.2 m. The error may be reduced by increasing the resolution (i.e. reducing the spacing) of the lateral groups, which are 0.1 m in the above example. Experimentation by the inventors has discovered that the 0.1 m spacing provides an adequate balance of memory utilization requirements and measurement error.

The system 110 may exclude any detections that are beyond a typical maximum trailer-dimension of 2.44 m×15.24 m.

Figure 14:
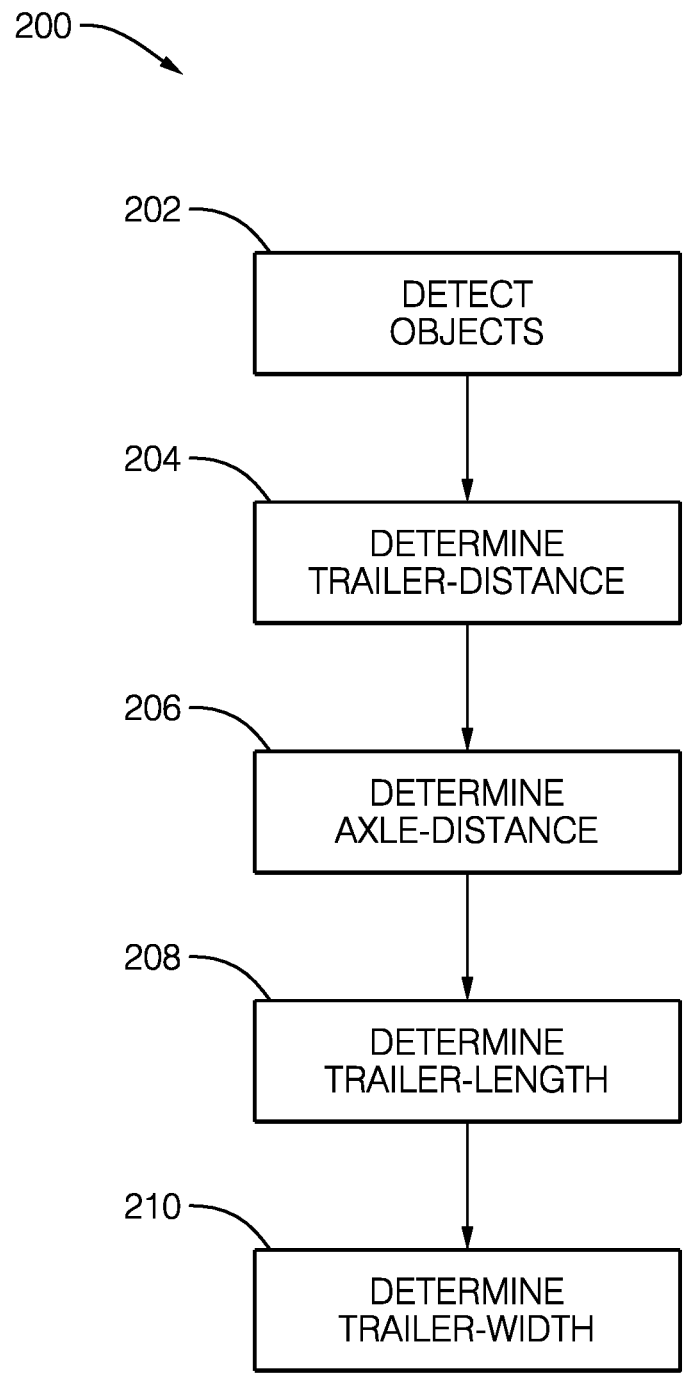
FIG. 14 is a flow chart of a detection method in accordance with yet another embodiment.

FIG. 14 is a flow chart that illustrates yet another embodiment of a detection method 200, hereafter referred to as the method 200, of operating a detection system 10, hereafter referred to as the system 10, and installed on a host-vehicle 12 towing a trailer 14. As will be described in more detail below, the method 200 in an improvement over other detection methods because the method 200 estimates a trailer-length 16 and trailer-width 18 based on detected targets by filtering out erroneous detections. The trailer 14 may be a cargo-trailer 14A that may be an enclosed-type with solid panels, or may be an open-type with an exposed frame. In the examples illustrated in FIGS. 1-5B the trailer 14 is the cargo-trailer 14A.

Step 202, DETECT OBJECTS, includes detecting, with a ranging-sensor 20, objects 26 proximate to the host-vehicle 12. FIG. 1 illustrates the system 10 that includes the ranging-sensor 20 and a controller-circuit 32 in communication with the ranging-sensor 20 that tracks the objects 26 as described above.

Step 204, DETERMINE TRAILER-DISTANCE, INCLUDES determining, with the controller-circuit 32, that the trailer 14 is being towed by the host-vehicle 12 and determining a trailer-distance 42. The controller-circuit uses the known method of zero range rate (ZRR) detections, as described above, to determine a distance 28 to a front 44 of a cargo-trailer 14A based on a first-group 46 of objects 26 illustrated in FIG. 4A.

Step 206, DETERMINE AXLE-DISTANCE, includes determining an axle-distance 56 between the front 44 of the cargo-trailer 14A and a trailer-axle 58 based on a second-group 60 of objects 26, as illustrated in FIG. 4B.

Step 208, DETERMINE TRAILER-LENGTH, includes determining, with the controller-circuit 32, a trailer-length 16 based on the trailer-distance 42 and the axle-distance 56. As described above, the trailer-length 16 (TL) is determined by a formula including the trailer-distance 42 (Lo), the axle-distance 56 (L1), and a constant 66 (C) using the following formula:

$$TL = Lo + L1 + L1*C$$

Step 210, DETERMINE TRAILER-WIDTH, includes determining, with the controller-circuit 32, a trailer-width 18. FIG. 5B illustrates a plot of the groups of the ZRR targets from FIG. 5A along the host-vehicle-lateral-axis 36 transverse to the host-vehicle-longitudinal-axis 34. The controller-circuit 32 further determines the trailer-width 18 of the cargo-trailer 14A by the distance 28 between a third-group 72 and a fourth-group 74 of objects 26 detected by the ranging-sensor 20.

Figure 15:
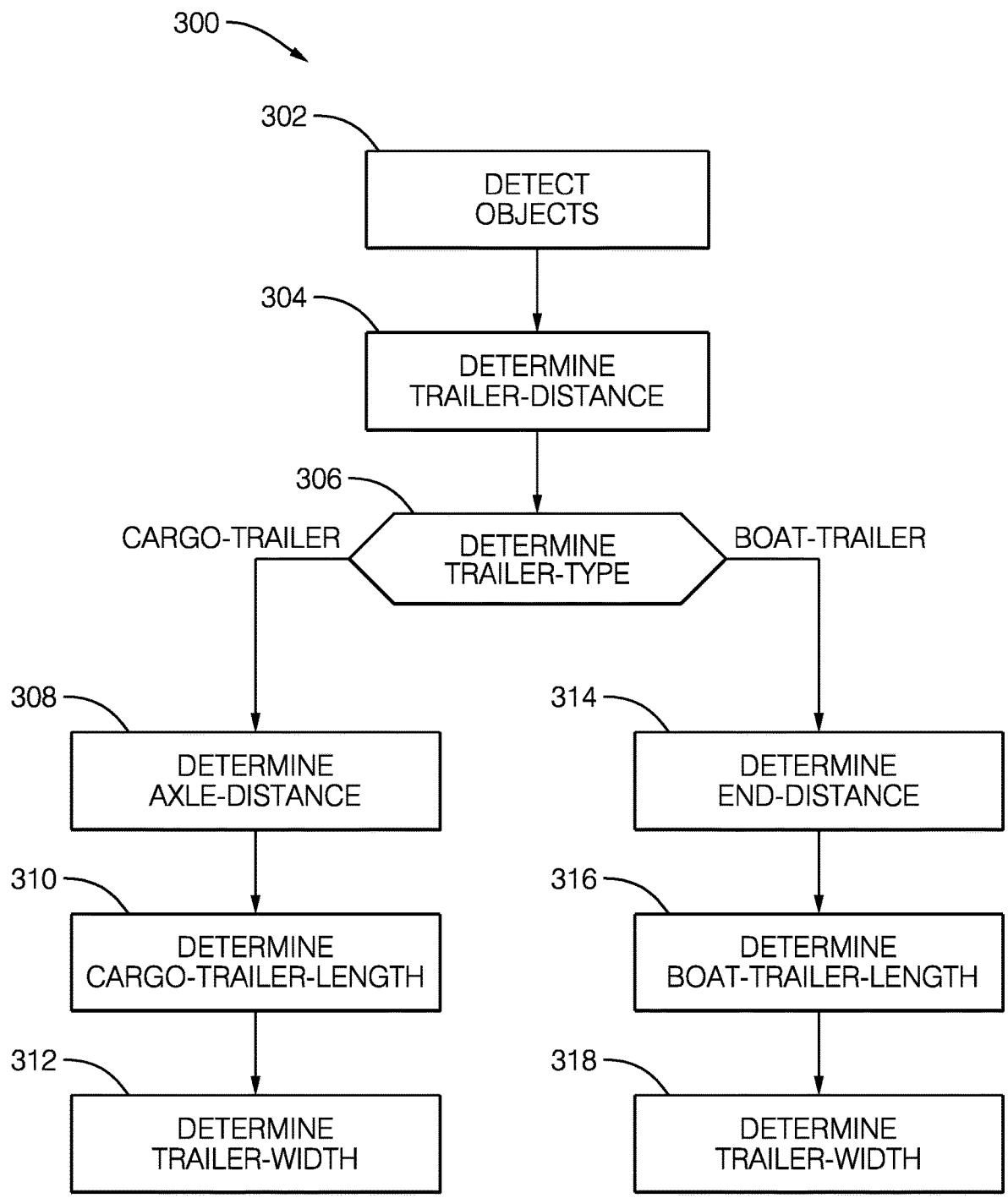
FIG. 15 is a flow chart of another detection method in accordance with yet another embodiment.

FIG. 15 is a flow chart illustrating yet another embodiment of a detection method 300, hereafter referred to as the method 300, of operating a detection system 110, hereafter referred to as the system 110, installed on a host-vehicle 112 towing a trailer 114. As will be described in more detail below, the system 110 in an improvement over other detection systems because the system 110 determines a trailer-type 113, a trailer-length 116 and a trailer-width 118 based on detected targets by filtering out erroneous detections. The trailer 114 may be a cargo-trailer 114A that may be an enclosed-type with solid panels, or may be an open-type with an exposed frame. The trailer 114 may also be a boat-trailer 114B. The boat-trailer 114B may, or may not, be carrying a boat, and may present a unique ranging-sensor-signal compared to the cargo-trailer 114A that may further assist in a determination of the type of trailer 114 being towed by the host-vehicle 112.

Step 302, DETECT OBJECTS, includes detecting, with a ranging-sensor 120, objects 126 proximate to the host-vehicle 112. FIG. 6 illustrates the system 110 that includes the ranging-sensor 120 and a controller-circuit 132 in communication with the ranging-sensor 120 that tracks the objects 126 as described above.

Step 304, DETERMINE TRAILER-DISTANCE, includes determining, with the controller-circuit 132, that the trailer 114 is being towed by the host-vehicle 112, and determining a trailer-distance 142 between the host-vehicle 112 and a front 144 of the trailer 114 based on a first-group 146 of objects 126 illustrated in FIG. 9A.

Step 306, DETERMINE TRAILER-TYPE, includes determining, with the controller-circuit 132, a trailer-type 113 being towed by the host-vehicle 112 based on a comparison of the trailer-distance 142 to a predetermined distance-threshold 155. The trailer-type 113 is characterized as a cargo-trailer 114A in accordance with a determination that the trailer-distance 142 is less than the distance-threshold 155 that is in a range of 2 m to 3 m. The trailer-type 113 is characterized as the boat-trailer 114B in accordance with the determination that the trailer-distance 142 is greater than the distance-threshold 155.

Step 308, DETERMINE AXLE-DISTANCE, includes determining, with the controller-circuit 132, an axle-distance 156 of the cargo-trailer 114A. In accordance with the determination that the trailer-type 113 is characterized as the cargo-trailer 114A, the controller-circuit 132 further determines the axle-distance 156 between the front 144 of the trailer 114 and a trailer-axle 158 based on a second-group 160 of objects 126 detected by the ranging-sensor 120, as illustrated in FIG. 9B.

Step 310, DETERMINE CARGO-TRAILER-LENGTH, includes determining, with the controller-circuit 132, a cargo-trailer-length 116A of the cargo-trailer 114A based on the trailer-distance 142 and the axle-distance 156. The cargo-trailer-length 116A (TL) is determined by a formula including the trailer-distance 142 (Lo), the axle-distance 156 (L1), and a constant 166 (C) using the following formula:

$$TL = Lo + L1 + L1*C$$

Step 312, DETERMINE TRAILER-WIDTH, includes determining, with the controller-circuit 132, a trailer-width 118 of the cargo-trailer 114A. FIG. 10B illustrates a plot of the groups of the ZRR targets from FIG. 10A along the host-vehicle-lateral-axis 136 transverse to the host-vehicle-longitudinal-axis 134. The controller-circuit 132 further determines the trailer-width 118 of the cargo-trailer 114A by the distance 128 between a third-group 172 and a fourth-group 174 of objects 126 detected by the ranging-sensor 120.

Step 314, DETERMINE END-DISTANCE, includes determining, with the controller-circuit 132, an end-distance 180 to an end of the boat-trailer 114B. FIG. 11A illustrates a plot of multiple radar-sensor 122 data acquisition cycles for the boat-trailer 114B that locate the ZRR targets along the host-vehicle-longitudinal-axis 134 and the host-vehicle-lateral-axis 136. FIG. 11B illustrates a plot of the groups of the ZRR targets from FIG. 11A along the host-vehicle-longitudinal-axis 134 only. In accordance with the determination that the trailer-type 113 is characterized as the boat-trailer 114B the controller-circuit 132 further determines the end-distance 180 to the end of the boat-trailer 114B based on a last-group 182 of objects 126 detected by the ranging-sensor 120. The last-group 182 is characterized by a last-distance 184 indicated by the ranging-sensor 120 and the controller-circuit 132 determines a boat-trailer-length 116B based on the end-distance 180, as illustrated in FIG. 12B.

Step 316, DETERMINE BOAT-TRAILER-LENGTH, includes determining, with the controller-circuit 132, the boat-trailer-length 116B. In accordance with the determination that the trailer-type 113 is characterized as the boat-trailer 114B, the controller-circuit 132 further determines the last-group 182 of objects 126 (group-F) determined by a last-detection-count 186 that is closer in magnitude to the peak-threshold 150 than to the noise-threshold 152 and is farthest in proximity to the host-vehicle 112, as illustrated in FIG. 12B.

Step 318, DETERMINE TRAILER-WIDTH, includes determining, with the controller-circuit 132, the trailer-width 118 of the boat-trailer 114B. FIG. 13B illustrates a plot of the groups of the ZRR targets from FIG. 13A along the host-vehicle-lateral-axis 136 transverse to the host-vehicle-longitudinal-axis 134. The controller-circuit 132 further determines the trailer-width 118 of the boat-trailer 114B by the distance 128 between the third-group 172 and the fourth-group 174 of objects 126 detected by the ranging-sensor 120.

The system 110 may exclude any detections that are beyond a typical maximum trailer-dimension of 2.44 m×15.24 m.

Accordingly, a detection system 10 (the system 10), a controller-circuit 32 for the system 10, and a method 200 of operating the system 10 are provided. The system 10 is an improvement over other detection systems because the system 10 estimates the trailer-length 16 and the trailer-width 18 by filtering out the phantom-objects 40.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

We claim:

1. A detection system, comprising:
a ranging-sensor, the ranging-sensor configured to detect objects proximate to a host-vehicle; and
a controller-circuit in communication with the ranging-sensor, the controller-circuit configured to:
determine a trailer-distance between the host-vehicle and a front of a trailer based on a distance to a first-group of objects detected by the ranging-sensor, said first-group characterized by a first-distance indicated by the ranging-sensor,
determine an axle-distance between the front of the trailer and a trailer-axle based on a second-group of objects, said second-group characterized by a second-distance indicated by the ranging-sensor,
determine a trailer-length based on the trailer-distance and the axle-distance,
determine a peak-threshold that represents detections of real-objects detected by the ranging-sensor, and
determine a noise-threshold that represents detections of phantom-objects detected by the ranging-sensor, wherein said peak-threshold is greater than the noise-threshold, said first-group determined by a first-detection-count that is closer in magnitude to the peak-threshold than to the noise-threshold, and said first-group is first closest in proximity to the host-vehicle.

2. The detection system in accordance with claim 1, wherein a width of the trailer is determined by a distance between a third-group and a fourth-group of objects detected by the ranging-sensor, said third-group characterized by a first-lateral-offset relative to a centerline of the host-vehicle as indicated by the ranging-sensor, said fourth-group characterized by a second-lateral-offset relative to the centerline of the host-vehicle as indicated by the ranging-sensor.

3. The detection system in accordance with claim 1, wherein the trailer-length (TL) is determined by a formula including the trailer-distance (Lo), the axle-distance (L1), and a constant (C).

4. The detection system in accordance with claim 3, wherein the formula is TL=Lo+L1+L1*C.

5. The detection system in accordance with claim 4, wherein C is in a range from 0.6 to 0.75.

6. The detection system in accordance with claim 5, wherein C is 0.7.

7. The detection system in accordance with claim 1, wherein the second-group of objects is determined by a second-detection-count that is closer in magnitude to the peak-threshold than to the noise-threshold and is second closest in proximity to the host-vehicle.

8. A detection system, comprising:
a ranging-sensor, the ranging-sensor configured to detect objects proximate to a host-vehicle; and
a controller-circuit in communication with the ranging-sensor, the controller-circuit configured to:
determine a trailer-distance between the host-vehicle and a front of a trailer based on a distance to a first-group of objects detected by the ranging-sensor, said first-group characterized by a first-distance indicated by the ranging-sensor,
determine a trailer-type being towed by the host-vehicle based on the trailer-distance,
determine a peak-threshold that represents detections of real-objects detected by the ranging-sensor, and
determine a noise-threshold that represents detections of phantom-objects detected by the ranging-sensor, the first-group of objects determined by a firstdetection-count that is closer in magnitude to the peak-threshold than to the noise-threshold and is first closest in proximity to the host-vehicle.

9. The detection system in accordance with claim 8, wherein the trailer-type is characterized as a cargo-trailer in accordance with a determination that the trailer-distance is less than a distance-threshold.

10. The detection system in accordance with claim 9, wherein the distance-threshold is in a range of 2 meters to 3 meters.

11. The detection system in accordance with claim 9, wherein a width of the trailer is determined by a distance between a third-group and a fourth-group of objects detected by the ranging-sensor, said third-group characterized by a first-lateral-offset relative to a centerline of the host-vehicle as indicated by the ranging-sensor, said fourth-group characterized by a second-lateral-offset relative to the centerline of the host-vehicle as indicated by the ranging-sensor.

12. The detection system in accordance with claim 9, wherein the controller-circuit further determines an axle-distance between the front of the trailer and a trailer-axle based on a second-group of objects, said second-group characterized by a second-distance indicated by the ranging-sensor, and determines a trailer-length based on the trailer-distance and the axle-distance.

13. The detection system in accordance with claim 12, wherein the trailer-length (TL) is determined by a formula including the trailer-distance (Lo), the axle-distance (L1), and a constant (C).

14. The detection system in accordance with claim 13, wherein the formula is TL=Lo+L1+L1*C.

15. The detection system in accordance with claim 14, wherein C is in a range from 0.6 to 0.75.

16. The detection system in accordance with claim 15, wherein C is 0.7.

17. The detection system in accordance with claim 12, wherein the second-group of objects is determined by a second-detection-count that is closer in magnitude to the peak-threshold than to the noise-threshold and is second closest in proximity to the host-vehicle.

18. The detection system in accordance with claim 8, wherein the trailer-type is characterized as a boat-trailer in accordance with a determination that the trailer-distance is greater than a distance-threshold.

19. The detection system in accordance with claim 18, wherein the distance-threshold is in a range from 2 meters to 3 meters.

20. The detection system in accordance with claim 18, wherein a width of the trailer is determined by a distance between a third-group and a fourth-group of objects detected by the ranging-sensor, said third-group characterized by a first-lateral-offset relative to a centerline of the host-vehicle as indicated by the ranging-sensor, said fourth-group characterized by a second-lateral-offset relative to the centerline of the host-vehicle as indicated by the ranging-sensor.

21. The detection system in accordance with claim 18, wherein the controller-circuit further determines an end-distance to an end of the trailer based on a last-group of objects detected by the ranging-sensor, said last-group characterized by a last-distance indicated by the ranging-sensor, and determines a trailer-length based on the end-distance.

22. The detection system in accordance with claim 21, wherein the last-group of objects is determined by a last-detection-count that is closer in magnitude to the peak-threshold than to the noise-threshold and is farthest in proximity to the host-vehicle.

23. A detection method, comprising:
detecting, with a ranging-sensor, objects proximate to a host-vehicle;
determining, with a controller-circuit in communication with the ranging-sensor, a trailer-distance between the host-vehicle and a front of the trailer based on a distance to a first-group of objects detected by the ranging-sensor, said first-group characterized by a first-distance indicated by the ranging-sensor;
determining, by the controller-circuit, an axle-distance between the front of a trailer and a trailer-axle based on a second-group of objects, said second-group characterized by a second-distance indicated by the ranging-sensor;
determining, by the controller-circuit, a trailer-length based on the trailer-distance and the axle-distance;
determining, by the controller-circuit, a peak-threshold that represents detections of real-objects detected by the ranging-sensor; and
determining, by the controller-circuit, a noise-threshold that represents detections of phantom-objects detected by the ranging-sensor, the peak-threshold greater than the noise-threshold, the first-group of objects determined by a first-detection-count that is closer in magnitude to the peak-threshold than to the noise-threshold and is first closest in proximity to the host-vehicle.

24. The detection method in accordance with claim 23, wherein a width of the trailer is determined by a distance between a third-group and a fourth-group of objects detected by the ranging-sensor, said third-group characterized by a first-lateral-offset relative to a centerline of the host-vehicle as indicated by the ranging-sensor, said fourth-group characterized by a second-lateral-offset relative to the centerline of the host-vehicle as indicated by the ranging-sensor.

25. The detection method in accordance with claim 23, wherein the trailer-length (TL) is determined by a formula including the trailer-distance (Lo), the axle-distance (L1), and a constant (C).

26. The detection method in accordance with claim 25, wherein the formula is TL=Lo+L1+L1*C.

27. The detection method in accordance with claim 26, wherein C is in a range from 0.6 to 0.75.

28. The detection method in accordance with claim 27, wherein C is 0.7.

29. The detection method in accordance with claim 23, wherein the second-group of objects is determined by a second-detection-count that is closer in magnitude to the peak-threshold than to the noise-threshold and is second closest in proximity to the host-vehicle.

30. A detection method, comprising:
with a ranging-sensor, objects proximate to a host-vehicle;
determining, with a controller-circuit in communication with the ranging-sensor, a trailer-distance between the host-vehicle and a front of the trailer based on a distance to a first-group of objects detected by the ranging-sensor, said first-group characterized by a first-distance indicated by the ranging-sensor, and determining a trailer-type being towed by the host-vehicle based on the trailer-distance;
determining, by the controller-circuit, a peak-threshold that represents detections of real-objects detected by the ranging-sensor; and
determining, by the controller-circuit, a noise-threshold that represents detections of phantom-objects detected by the ranging-sensor, the first-group of objects is determined by a first-detection-count that is closer in magnitude to the peak-threshold than to the noise-threshold and is first closest in proximity to the host-vehicle.

31. The detection method in accordance with claim 30, wherein the trailer-type is characterized as a cargo-trailer in accordance with a determination that the trailer-distance is less than a distance-threshold.

32. The detection method in accordance with claim 31, wherein the distance-threshold is in a range of 2 meters to 3 meters.

33. The detection method in accordance with claim 31, wherein a width of the trailer is determined by a distance between a third-group and a fourth-group of objects detected by the ranging-sensor, said third-group characterized by a first-lateral-offset relative to a centerline of the host-vehicle as indicated by the ranging-sensor, said fourth-group characterized by a second-lateral-offset relative to the centerline of the host-vehicle as indicated by the ranging-sensor.

34. The detection method in accordance with claim 31, wherein the controller-circuit further determines an axle-distance between the front of the trailer and a trailer-axle based on a second-group of objects, said second-group characterized by a second-distance indicated by the ranging-sensor, and determines a trailer-length based on the trailer-distance and the axle-distance.

35. The detection method in accordance with claim 34, wherein the trailer-length (TL) is determined by a formula including the trailer-distance (Lo), the axle-distance (L1), and a constant (C).

36. The detection method in accordance with claim 35, wherein the formula is TL=Lo+L1+L1*C.

37. The detection method in accordance with claim 36, wherein C is in a range from 0.6 to 0.75.

38. The detection method in accordance with claim 37, wherein C is 0.7.

39. The detection method in accordance with claim 34, wherein the second-group of objects is determined by a second-detection-count that is closer in magnitude to the peak-threshold than to the noise-threshold and is second closest in proximity to the host-vehicle.

40. The detection method in accordance with claim 30, wherein the trailer-type is characterized as a boat-trailer in accordance with a determination that the trailer-distance is greater than a distance-threshold.

41. The detection method in accordance with claim 40, wherein the distance-threshold is in a range from 2 meters to 3 meters.

42. The detection method in accordance with claim 40, wherein a width of the trailer is determined by a distance between a third-group and a fourth-group of objects detected by the ranging-sensor, said third-group characterized by a first-lateral-offset relative to a centerline of the host-vehicle as indicated by the ranging-sensor, said fourth-group characterized by a second-lateral-offset relative to the centerline of the host-vehicle as indicated by the ranging-sensor.

43. The detection method in accordance with claim 40, wherein the controller-circuit further determines an end-distance to an end of the trailer based on a last-group of objects detected by the ranging-sensor, said last-group characterized by a last-distance indicated by the ranging-sensor, and determines a trailer-length based on the end-distance.

44. The detection method in accordance with claim 43, wherein the last-group of objects is determined by a last-detection-count that is closer in magnitude to the peak-threshold than to the noise-threshold and is farthest in proximity to the host-vehicle.

* * * * *